(12) United States Patent
Chennamsetty et al.

(10) Patent No.: US 10,002,048 B2
(45) Date of Patent: Jun. 19, 2018

(54) POINT-IN-TIME SNAP COPY MANAGEMENT IN A DEDUPLICATION ENVIRONMENT

(71) Applicant: INTERNATIONAL BUSINESS MACHINES CORPORATION, Armonk, NY (US)

(72) Inventors: Ramamohan Chennamsetty, Highland, NY (US); Blaine H. Dolph, Western Springs, IL (US); Sandeep R. Patil, Pune (IN); Riyazahamad M. Shiraguppi, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 874 days.

(21) Appl. No.: 14/279,256

(22) Filed: May 15, 2014

(65) Prior Publication Data
US 2015/0331756 A1 Nov. 19, 2015

(51) Int. Cl.
*G06F 17/00* (2006.01)
*G06F 17/30* (2006.01)
*G06F 11/14* (2006.01)
*G06F 3/06* (2006.01)

(52) U.S. Cl.
CPC ............ *G06F 11/14* (2013.01); *G06F 3/0643* (2013.01); *G06F 11/1453* (2013.01); *G06F 17/30156* (2013.01); *G06F 17/30159* (2013.01); *G06F 2201/84* (2013.01)

(58) Field of Classification Search
CPC ...... G06F 3/0676; G06F 3/064; G06F 3/0643; G06F 17/30159

USPC .................................................. 707/649, 664
See application file for complete search history.

(56) References Cited

U.S. PATENT DOCUMENTS

| | | | |
|---|---|---|---|
| 7,379,954 B2 | 5/2008 | Shoens | |
| 7,593,973 B2 | 9/2009 | Lee | |
| 7,739,241 B2 | 6/2010 | Boutcher | |
| 7,877,569 B2 * | 1/2011 | Honda | G06F 3/0607 711/103 |
| 8,190,835 B1 | 5/2012 | Yueh | |
| 8,190,850 B1 | 5/2012 | Davenport et al. | |

(Continued)

OTHER PUBLICATIONS

Clements, A.T., et al., "Decentralized Deduplication in SAN Cluster File Systems", Proceedings of the 2009 Conferences on USENIX, 2009, 14 pp.

(Continued)

*Primary Examiner* — Marc Filipczyk
(74) *Attorney, Agent, or Firm* — William K. Konrad; Konrad Raynes Davda & Victor LLP

(57) ABSTRACT

In accordance with one embodiment of the present description, a logical file unit containing a set of data stored in cache or other memory and mapped by a reference pointer to a physical file unit in a storage, may be overwritten with new data in the memory without first read/write copying the data in memory to a new logical file unit in the file system. Instead, the original physical file unit of data in the storage is preserved and the original reference pointer for the original physical file unit of data may be used to map a new logical file unit in the file system to the original physical file unit storing the original set of data. Other aspects are described.

12 Claims, 18 Drawing Sheets

Deduplication Mapping Data Structure (1310)

| Storage Block | Status | Reference Pointer Value | Referencing Logical Blocks |
|---|---|---|---|
| PBlock100 | Allocated | HashA | ~~LBlock100~~ LBlock200 |
| PBlock110 | Allocated | HashG | LBlock120, LBlock180 |
| PBlock120 | Allocated | HashF | LBlock140 |
| PBlock130 | Freed | HashB | LBlock100 |
| PBlock140 | Allocated | HashM | LBlock160 |
| PBlock150 | Freed | ----- | ----- |
| ⋮ | | | |
| PBlock200 | Allocated | HashB | LBlock100 |

(56) References Cited

U.S. PATENT DOCUMENTS

| | | | |
|---|---|---|---|
| 8,290,911 B1* | 10/2012 | Janakiraman | G06F 17/30159 707/640 |
| 9,405,709 B1* | 8/2016 | Salpekar | G06F 11/00 |
| 2003/0159007 A1 | 8/2003 | Sawdon et al. | |
| 2006/0047926 A1 | 3/2006 | Zheng | |
| 2008/0256311 A1 | 10/2008 | Lee | |
| 2009/0204650 A1 | 8/2009 | Wong et al. | |
| 2010/0228903 A1* | 9/2010 | Chandrasekaran | G06F 9/45558 711/6 |
| 2011/0191555 A1 | 8/2011 | Narayanan | |
| 2011/0208909 A1* | 8/2011 | Kawaguchi | G06F 3/0611 711/113 |
| 2013/0086308 A1* | 4/2013 | Nakata | G06F 3/0689 711/103 |

OTHER PUBLICATIONS

Jong, C., et al., "Storage Deduplication for Virtual Ad Hoc Network Testbed By File-Level Block Sharing", Proceedings of the 19th ACM international Symposium on High Performance Distributed Computing, Jun. 2010, 8 pp.

Wikipedia, "Data Deduplication", [online], last Modified Jan. 8, 2014, [Retrieved on Jan. 14, 2014], retrieved from the Internet at <URL: http://en.wikipedia.org/wiki/Data_deduplication>, 7 pp.

Wikipedia, "Hash Function", [online], last Modified Jan. 10, 2014, [Retrieved on Jan. 14, 2014], retrieved from the Internet at <URL: http://en.wikipedia.org/wiki/Hash_function>, 11 pp.

Wikipedia, "SCSI CDB", [online], last Modified May 13, 2013, [Retrieved on Jan. 14, 2014], retrieved from the Internet at <URL: http://en.wikipedia.org/wiki/SCSI_CDB>, 3 pp.

* cited by examiner

File Manager mapping operations

650

| Deduplication Mapping Data Structure | | | |
|---|---|---|---|
| Storage Block | Status | Block Snap Copy Relationship | Block Snap Copy Relationship |
| PBlock0 | Allocated | Hash1 | LBlock0, LBlock2 |
| PBlock10 | Allocated | Hash2 | LBlock1, LBlock3 |
| PBlock20 | Free | ------ | ------ |
| PBlock30 | Allocated | Hash3 | LBlock4 |
| PBlock40 | Allocated | ------ | ------ |
| PBlock50 | Freed | ------ | ------ |

⋮

| PBlockn | Freed | ------ | ------ |

| Write Block Operation Data Structure | | |
|---|---|---|
| Logical Block | Status | Block Snap Copy Relationship |
| LBlock100 | Allocated | LBlock200 |
| LBlock120 | Allocated | ------ |
| LBlock140 | Allocated | LBlock240 |
| LBlock160 | Allocated | ------ |
| LBlock180 | Allocated | ------ |
| LBlock200 | Uncopied | LBlock100 |
| LBlock220 | Free | ------ |
| LBlock240 | Uncopied | LBlock140 |
| LBlock260 | Free | ------ |

| Write Block Operation Data Structure | | |
|---|---|---|
| Logical Block | Status | Block Snap Copy Relationship |
| LBlock100 | Allocated | ------ |
| LBlock120 | Allocated | ------ |
| LBlock140 | Allocated | LBlock240 |
| LBlock160 | Allocated | ------ |
| LBlock180 | Allocated | ------ |
| LBlock200 | Allocated | ------ |
| LBlock220 | Free | ------ |
| LBlock240 | Uncopied | LBlock140 |
| LBlock260 | Free | ------ |

| Deduplication Mapping Data Structure | | | |
|---|---|---|---|
| Storage Block | Status | Block Snap Copy Relationship | Block Snap Copy Relationship |
| PBlock100 | Allocated | HashA | LBlock100 |
| PBlock110 | Allocated | HashG | LBlock120, LBlock180 |
| PBlock120 | Allocated | HashF | LBlock140 |
| PBlock130 | Freed | ------ | ------ |
| PBlock140 | Allocated | HashM | LBlock160 |
| PBlock150 | Freed | ------ | ------ |

⋮

| | | | |
|---|---|---|---|
| PBlock200 | Freed | ------ | ------ |

| Deduplication Mapping Data Structure | | | |
|---|---|---|---|
| Storage Block | Status | Reference Pointer Value | Referencing Logical Blocks |
| PBlock100 | Allocated | HashA | ~~LBlock100~~ LBlock200 |
| PBlock110 | Allocated | HashG | LBlock120, LBlock180 |
| PBlock120 | Allocated | HashF | LBlock140 |
| PBlock130 | Freed | HashB | LBlock100 |
| PBlock140 | Allocated | HashM | LBlock160 |
| PBlock150 | Freed | ------ | ------ |

⋮

| | | | |
|---|---|---|---|
| PBlock200 | Allocated | HashB | LBlock100 |

FIG. 13B

POINT-IN-TIME SNAP COPY MANAGEMENT IN A DEDUPLICATION ENVIRONMENT

BACKGROUND

1. Field of the Invention

This description relates in general to distributed computing systems, and more particularly, to a method, system and computer program product for managing a point-in-time snap copy of a storage unit in a de-duplication environment of a distributed computing system.

2. Description of Related Art

One or more hosts may store large quantities of data in a group of storage units, which is typically controlled by a storage controller. Examples of such a storage controllers include the IBM TotalStorage® Enterprise Storage Server® (ESS) and the IBM System Storage DS8000 series. A storage controller such as the ESS or DS8000 may provide a number of functions accessible by the hosts for protecting data, backing the data up, and making the data available for use.

Amongst the functions which may be provided by a storage controller is a data preservation function which can preserve an identified set of data at a particular point in time. For example, data may be preserved in a "read/write copy" operation in which data is copied from one location to another location by reading the data from the one location and writing the data to the other location. The ESS and DS8000 series storage controllers support another data preservation function, a point-in-time snap copy function referred to as "FlashCopy", which enables an instant copy to be made of a set of tracks in a source volume. One feature of such point-in-time snap copy functions is that the data of the copy is frequently made immediately available for read or write access. The identified data may be for example, a set of tracks which can consist of an entire volume, a data set, or just a selected set of tracks, for example.

In one mode of a point-in-time snap copy function, a copy of all of the data to be preserved at the particular point in time, is eventually made by read/write copying the identified data from the source volume to the target volume, typically in a background read/write copy mode. If a host attempts to read data from the target volume before it is read/write copied over to the target volume, the read operation is directed to the source volume containing the original data. If a host attempts to update the data on the source volume which is to be preserved on the target volume, that update is typically temporarily delayed until the old data to be updated is read/write copied to the target volume for preservation. Once a particular data location of the set of identified data on the source volume has been successfully read/write copied to the target volume by the background read/write copy operation, that data location on the source volume is freed for subsequent immediate updating by a host.

A storage controller typically has a memory, often referred to as a cache, to temporarily store data accessed from the storage units. Read and write operations are frequently performed more quickly in the cache memory as compared to read or write operations for data stored in the storage units. Thus, data is often cached in the cache in anticipation of a read operation from a host requesting that data. Similarly, write operations are frequently performed on the data in cache which subsequently "flushes" the new write data to the storage units for storage.

In order to shrink storage requirements and improve bandwidth efficiency, duplicate data may be eliminated by a deduplication engine which may be implemented in hardware, software or both. In the deduplication process, duplicate data is deleted, leaving only one copy of the data to be stored. This single copy is often referred to as the "Master" copy and the redundant copies which are deleted are often referred to as "secondary" copies. For the redundant or secondary copies which are deleted, a reference pointer which points to the master copy, is typically maintained.

The reference pointer is typically calculated by processing a set of data, often referred to as a "chunk" of data, using a hash function or other algorithm. If a set of data produces the same reference pointer value as a previously stored set of data, it is assumed that the two sets of data are copies of each other and only one copy of the two sets of data may be retained.

A storage controller frequently maintains a file system which includes a user component which manages files within directories, file path traversals, and user access to the files, for example. A storage component of the files system determines how a file is physically stored on a storage unit.

The file system often breaks up a file into smaller units, such as file blocks. Each file block may be mapped by the file system to a logical file unit such as a logical block which in turn is mapped to an actual physical file unit such as a physical block of data stored on a storage unit. The mapping of logical blocks to physical blocks facilitates separating file management from storage management.

SUMMARY

Provided are a method, system, and program for performing a copy-on-write operation which can, in some embodiments, reduce or eliminate a read/write copy operation, and instead map a block to a physical block containing preserved data. In one embodiment, the copy-on-write operation is performed on a first logical block of a file wherein the first logical block is mapped by a deduplication engine to a first physical block of data in storage, which stores a first set of data. In one aspect of the present description, the performing of the copy-on-write operation includes establishing a point-in-time snap copy relationship between the first logical block and a second logical block, and writing a second set of data to the first logical block to overwrite the first set of data of the first logical without first read/write copying the first set of data to the second logical block. The deduplication engine maps the second logical block to the first physical block storing the first set of data. The second set of data is stored in a second physical block of the storage, and the deduplication engine maps the first logical block to the second physical block of the storage so that the second physical block stores the second set of data modified from the first data. Other embodiments, aspects and features are described herein.

BRIEF DESCRIPTION OF THE DRAWINGS

FIG. 6b illustrates an example of a prior art deduplication mapping data structure.

FIGS. 10a and 10b illustrate an example of a write block operation data structure in accordance with an embodiment of the present description.

FIGS. 13a and 13b illustrate an example of a deduplication mapping data structure used by a deduplication engine in a block flush operation in connection with a copy on write operation in accordance with one embodiment of the present description.

DETAILED DESCRIPTION

Figure 1:
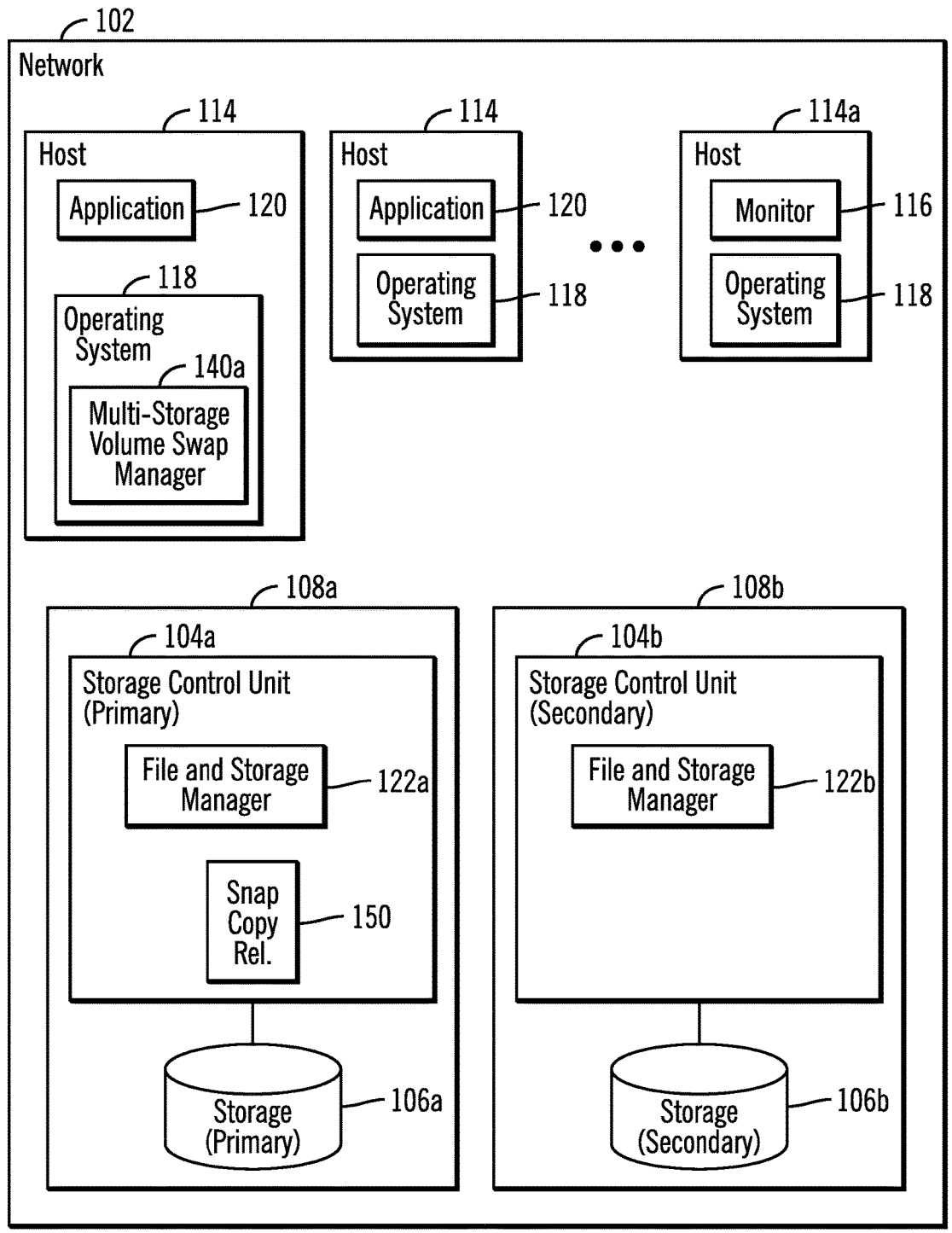
FIG. 1 illustrates an example of a network computing environment, employing point-in-time snap copy management in a deduplication environment, in accordance with one embodiment of the present description.

FIG. 1 illustrates an embodiment of a network computing environment having input/output (I/O) operations issued by at least one host to access storage locations of a storage unit, for reading data from and writing updates to a file of which one or more portions may be cached in a cache or stored in a storage unit. It is appreciated that situations arise in which it may be appropriate to make a copy of a set of data before writing new data to that set of data.

In accordance with one embodiment of the present description, it is recognized that a logical file unit containing a set of data stored in cache or other memory and mapped by a reference pointer to a physical file unit in a storage, may be overwritten with new data in the memory without first read/write copying the data in memory to a new logical file unit in the file system. Instead, the original physical file unit of data in the storage is preserved and the original reference pointer for the original physical file unit of data may be used to map a new logical file unit in the file system to the original physical file unit storing the original set of data. In this manner, a copy of the original set of data is preserved without actual read/write copying of the set of data from the original logical file unit to the new logical file unit prior to writing the new set of data to the original logical file unit. It is appreciated that other features may be realized instead of or in addition to those described herein, depending upon the particular application.

It is believed that file and storage management in accordance with the present description can facilitate data operations such as copy on write operations by reducing actual read/write copying of data from the original to the copy. Other features and advantages may be realized, depending upon the particular application.

Although the embodiment of FIG. 1 is described in connection with a point-in-time snap copy relationship, it is believed that aspects of the present description are applicable to other types of copy relationships, depending upon the particular application. Additional features are discussed in the present description. It is appreciated that still other features may be realized instead of or in addition to those discussed herein, depending upon the particular application.

In the illustrated embodiment, a copy relationship identifies a source location, such as a primary memory or storage location, and a target location, such as a secondary memory or storage location, in which data stored at the source location is to be copied to the target location. Thus, as used herein, a primary or source location and a secondary or target location are memory or storage locations related by a copy relationship.

In the illustrated embodiment, a network 102 includes storage control units or storage controllers 104a, 104b, and data storages 106a, 106b. The storage control unit 104a and its associated data storage 106a provide a storage subsystem 108a. Similarly, the storage control unit 104b and its associated data storage 106b provide a storage subsystem 108b. The storage control units 104a, 104b, manage the copying of updates from a primary storage subsystem to a secondary storage subsystem. In the configuration illustrated in FIG. 1, the storage control unit 104a and the data storage 106a have been configured as a primary storage control unit and the primary storage, respectively. Similarly, the storage control unit 104b and its data storage 106b have been configured as a secondary storage control unit and a secondary storage, respectively. Hence, in the configuration depicted in FIG. 2, the storage control unit 104a will be referred to as a primary storage control unit 104a and the data storage 106a will be referred to as a primary storage 106a. Similarly, the storage control unit 104b will be referred to as a secondary storage control unit 104b and the data storage 106b will be referred to as a secondary data storage 106b. In some embodiments, the storage control units and storages may be reconfigured to change the associated primary and secondary roles within a copy relationship.

The network 102 further includes one or more hosts 114 writing updates to the primary storage 106a. At least one such host 114, such as the host 114a, has in this embodiment, storage management functions including a monitor program 116 monitoring failures in the availability of the primary storage control unit 104a. In some embodiments, the monitor program 116 may be operated in a device apart from the hosts. The components 104a, 104b, 106a, 106b, and 114 are connected to the network 102 and the network 102 enables communication among these components. The network 102 may include one or more switches to provide one or more paths of communication between the different network 102 elements.

The primary storage control unit 104a is located at a first site and the secondary storage control unit 104b is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the network 102. For example, the primary and secondary storage control units may be two logical storage control units of the same physical control unit.

A typical host 114 includes an operating system 118 and an application 120 that writes updates to the primary 106a or secondary 106b storage. The host 114a which includes the monitor program 116 may omit the update writing applications 120 in some embodiments. The primary 104a and secondary 104b storage control units include file and storage managers 122a and 122b to manage data file management and storage management operations including point-in-time snap copying operations.

The monitor program 116 may monitor the primary storage control unit 104a and upon detecting a failure event, may utilize a storage unit swap manager 140a of an operating system 118 of a host 114, to cause a failover operation to cause updates from the host 114 to be sent to the secondary storage control unit 104b instead of to the primary storage control unit 104a. If the storage 106a fails while updates to the primary storage 106a are being applied to the storage 106b, then the updates that did not complete being mirrored to the storage 106b can be recovered and applied to the storage 106b.

The network 102 includes a fabric which may comprise a Storage Area Network (SAN), Local Area Network (LAN), Intranet, the Internet, Wide Area Network (WAN), peer-to-peer network, wireless network, arbitrated loop network, etc. The storages 106a, 106b may comprise an array of storage devices, such as a Just a Bunch of Disks (JBOD), Direct Access Storage Device (DASD), Redundant Array of Independent Disks (RAID) array, virtualization device, tape storage, flash memory, etc.

Communication paths from the storage subsystems to the hosts 114 may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 2:
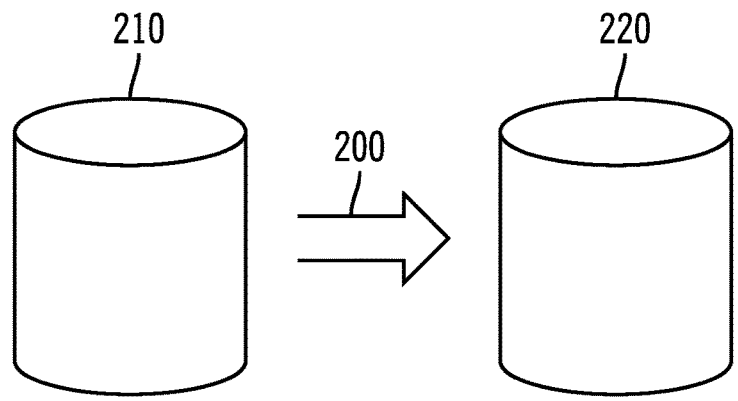
FIG. 2 illustrates an example of a point-in-time snap copy operation of the network computing environment of FIG. 1.

The file and storage manager 122a, 122b is invoked to establish a copy relationship such as a point-in-time snap copy relationship 150, between first and second memory or storage locations in a storage subsystem. The storage control units 104a, 104b may comprise enterprise storage servers, such as the IBM DS8000 series, for example. In the illustrated embodiment, the copy relationship 150 comprises a point-in-time snap copy relationship for a pair of memory or storage locations in which a set of data within the primary locations of the snap copy relationship 150 at a particular point-in-time, is copied to the secondary locations of the snap copy relationship 150. It is appreciated that other types of copy relationships may be established, depending upon the particular application. FIG. 2 depicts an example of a prior art point-in-time snap copy operation 200 copying data from a source volume 210 to a target volume 220.

The file and storage manager 122a, 122b managing the copy relationship 150 may be implemented using synchronous copy operations, such as a peer-to-peer remote copy (PPRC) program. An example of a PPRC program is the IBM Tivoli Storage Productivity Center for Replication copy program that enables the copying of updates to the primary storage 106a, to the secondary storage 106b. The file and storage manager 122a, 122b, may also implement synchronous or asynchronous remote copy operations where updates to the primary 106a or secondary 106b storage are mirrored to a corresponding location in at a remote site. The described operations may be implemented with other programs such as other copy programs or other global recovery programs.

Figure 3:
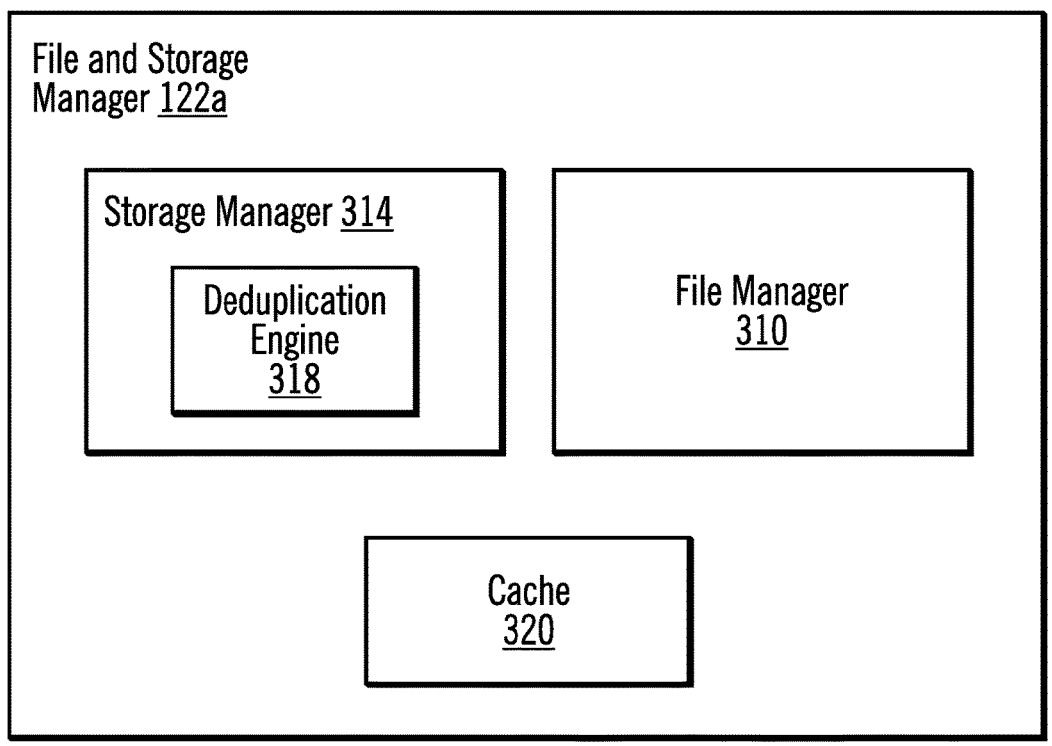
FIG. 3 illustrates an example of a file and storage manager of the network computing environment of FIG. 1.

In the illustrated embodiment, each file and storage manager 122a, 122b includes a file system which defines a process for naming files, placing them in storage and retrieving them from storage. As shown in FIG. 3, the file and storage manager 122a, for example, includes a file manager 310 for managing files within directories, file path traversals and user access to the files. A storage manager 314 of the file and storage manager 122a, manages physical storage of each file in storage 106a. In the illustrated embodiment, the storage manager 314 includes a deduplication engine 318.

Memory such as cache 320 is frequently capable of providing faster access for read and write operations as compared to storage 106a. As a result, in this embodiment, files may be temporarily stored in a cache memory 320 to facilitate read and write operations from and to the files, respectively. It is appreciated that in some embodiments, a cache may be omitted, depending upon the particular application.

To further facilitate file and storage management, files are frequently subdivided into file units, such as file blocks. File blocks are mapped by the file manager 310 to logical blocks which may be temporarily stored in the cache 320. The logical blocks are in turn mapped by the storage manager 314 to actual physical storage blocks stored in the storage 106a (FIG. 1). Mapping of logical blocks to physical blocks is frequently employed to permit a file manager such as the file manager 314 to manage the files with a degree of independence from the associated storage manager.

Figure 4:
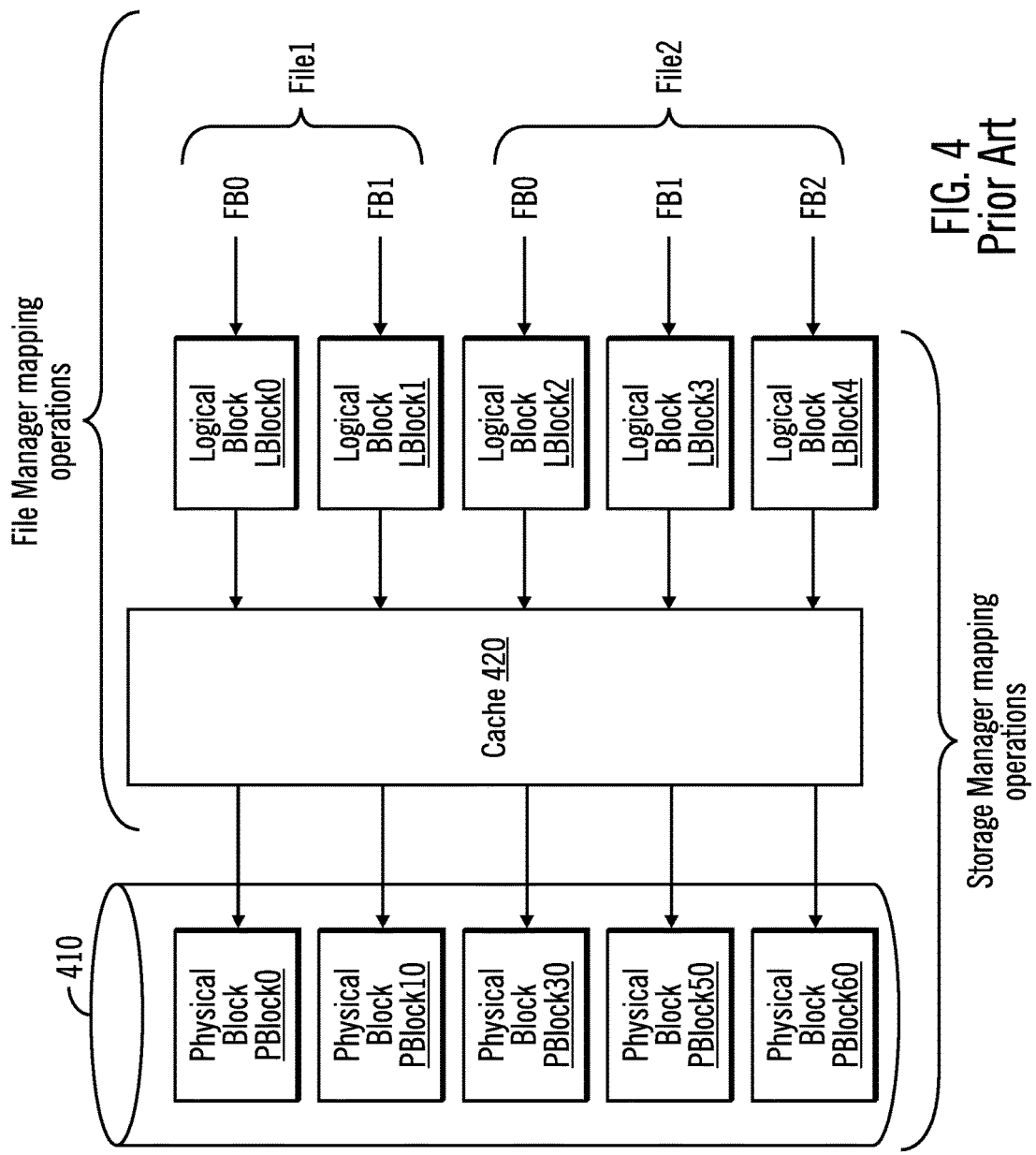
FIG. 4 illustrates an example of prior art file manager mapping operations and prior art storage manager mapping operations.

For example, a file File1 indicated in FIG. 4 includes two files blocks referenced as file blocks FB0, FB1, which are mapped by a prior art file manager to logical blocks LBlock0, LBlock1, respectively, which are then mapped by a prior art storage manager to actual physical storage blocks PBlock0 and PBlock10, respectively, in a storage 410. Similarly a second file File2 is shown to have three file blocks FB0, FB1, FB2, which are mapped by the file manager to logical blocks LBlock2, LBlock3 and LBlock4, when are mapped by a prior art storage manager to physical storage blocks PBlock30, PBlock50, and PBlock60, respectively.

Since storage accesses are frequently slower than memory accesses, data blocks as represented by the logical blocks of FIG. 4 may be stored in a cache 420. On a first read operation issued by a host, data is copied in blocks from the storage 410 to the cache 420. Subsequent accesses to the data are performed from that data now residing in the cache 420. For a write operation, data is first written to the cache 420 in blocks and then periodically "pushed" to the storage 410 in a background data read/write copying operation. This push process is often referred to as a "Block Flush operation." Use of the cache can provide performance benefits as storage accesses may be skipped for read/write operations performed in cache.

A "snapshot" is a common industry term denoting the ability to record the set of data of a storage device or file system at any given moment and preserve that snapshot as a guide for restoring the data of the storage device or file system in the event that it fails. A snapshot primarily creates a point-in-time copy of the data and thus is also often referred to as a point-in-time snap copy. Typically, a point-in-time snap copy is done instantly and made available for use by other applications such as data protection, data analysis and reporting, and data replication applications. The original copy of the data continues to be available to the applications without interruption, while the point-in-time snap copy is used to perform other functions on the data. Point-in-time snap copies can facilitate improved application availability, faster recovery, easier back up management of large volumes of data, reduction in exposure to data loss, virtual elimination of backup windows, and can lower total cost of ownership (TCO).

Another frequently employed data operation is often referred to as a "Copy-On-Write File System Snapshot." As long as multiple programs limit access to a particular set of data to read-only access, providing the accessing programs a reference pointer which points to a common source of the particular set of data is often sufficient. However, if at least one of the accessing programs needs at some point to write data to the particular set of data, a private copy of the data is made utilizing the Copy-On-Write (COW) file system snapshot or file system point-in-time snap copy.

Figure 5A:
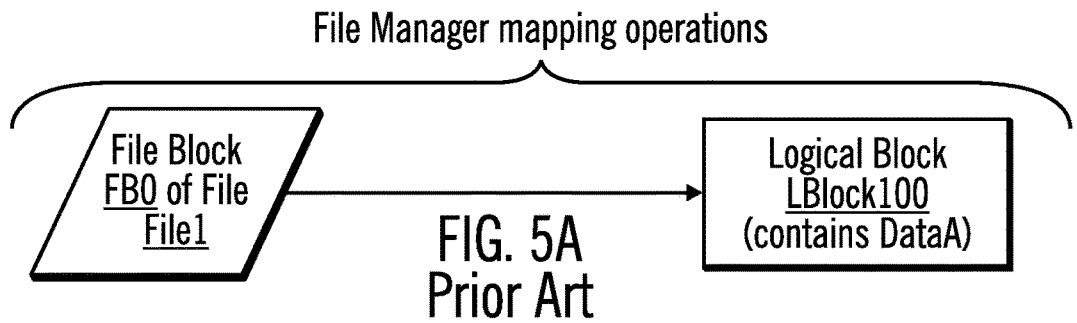
FIGS. 5a-5d illustrates an example of prior art file manager mapping operations in connection with a prior art copy on write operation.

For example, as shown in the prior art example of FIG. 5a, file block FB0 of a first file File1, is mapped by a file manager to a logical block LB100, containing a set of data referenced as data set DataA. In a prior art snapshot or point-in-time snap copy operation, a copy or target file block FB0 of the target file SnapFile1 is allocated by the file manager but a new logical block is not allocated by the file manager until data is to be written to the original file block FB0. Instead, as depicted in FIG. 5b, both the file block FB0 of the original or source file File1, and the copy or target file block FB0 of the target file SnapFile1 are mapped by the file manager to the same logical block LBlock100 since prior to the data write, the data of the file blocks remains unmodified, that is, remains the data set DataA.

Figure 5B:
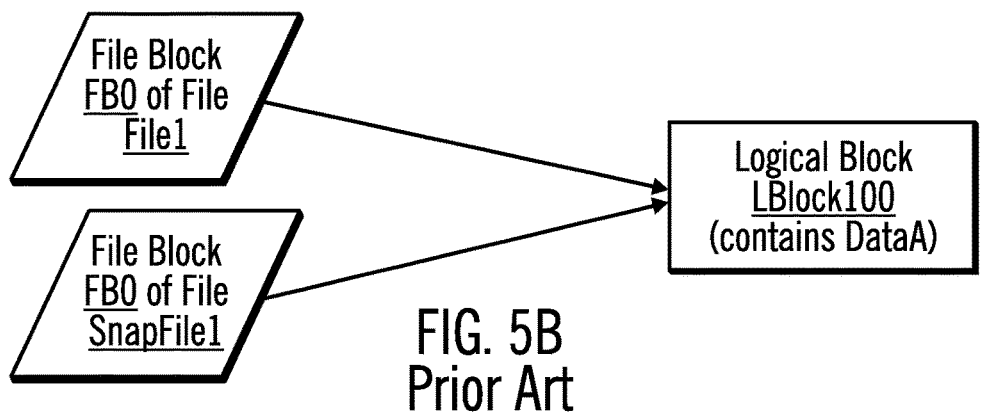
Figure 5C:
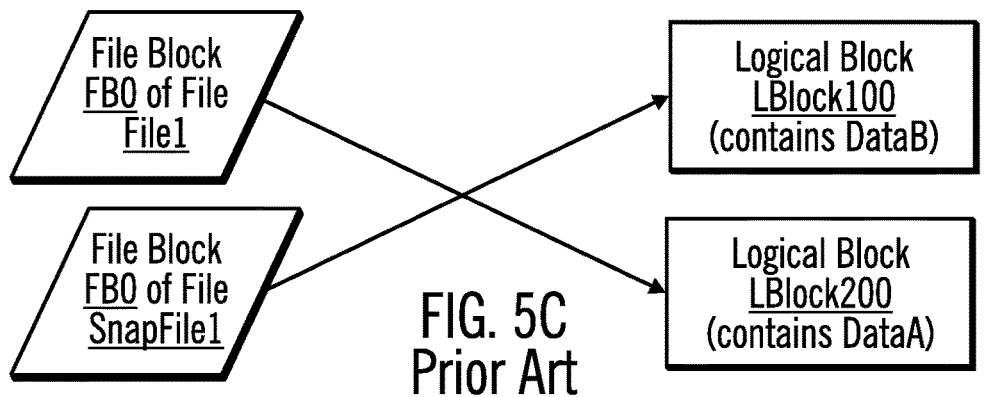
Figure 5D:
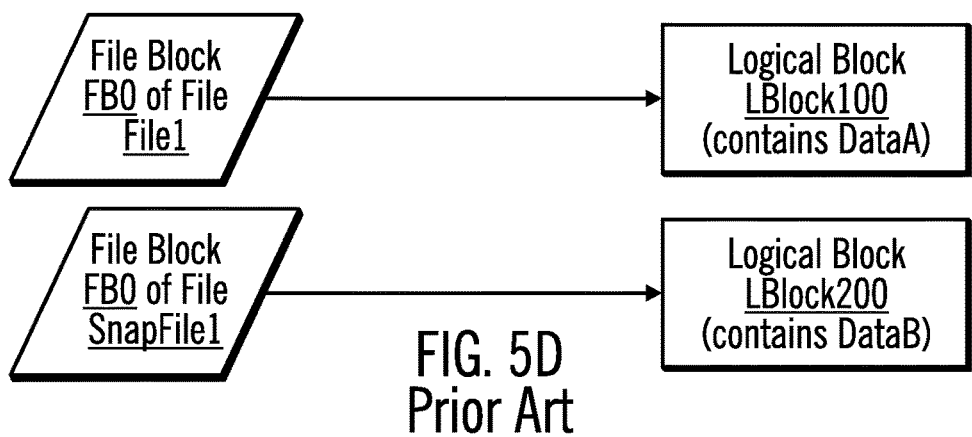

However, should a program need to write data to the file block FB0 of the first file File1 in a prior art copy-on-write operation, not only is a new file block FB0 of a new file SnapFile1 allocated by the file manager as shown in FIGS. 5b, 5c, but a new logical block LBlock200 is allocated by the file manager as shown in FIG. 5c. The original data set DataA is read/write copied from the source logical block LB100 to the new target logical block LBlock200 and the original file block FB0 of the original or source file File1 is mapped by the file manager to the new logical block LBlock200 to which the original data set DataA has been read/write copied. In addition, the new file block FB0 of the new file SnapFile1 is mapped by the file manager to the original logical block LBlock100 to which the new data set DataB has been written. In this manner, the writing program is provided a private copy of the modified data set (DataB). Alternatively, in other prior art copy-on-write operations, the original data set DataA may remain with the original logical block LBlock100 and the new data set DataB is written to the new logical block LBlock200 as shown in FIG. 5d.

Another frequently employed data operation is often referred to as "deduplication" in which redundant data is eliminated to significantly shrink storage requirements and improve bandwidth efficiency. In a typical deduplication process, duplicate data is deleted, leaving only one copy of the data to be stored. This single copy is often referred to as the "Master copy" and each deleted copy (secondary copy) keeps a reference pointer which points to this master copy.

Figure 6A:
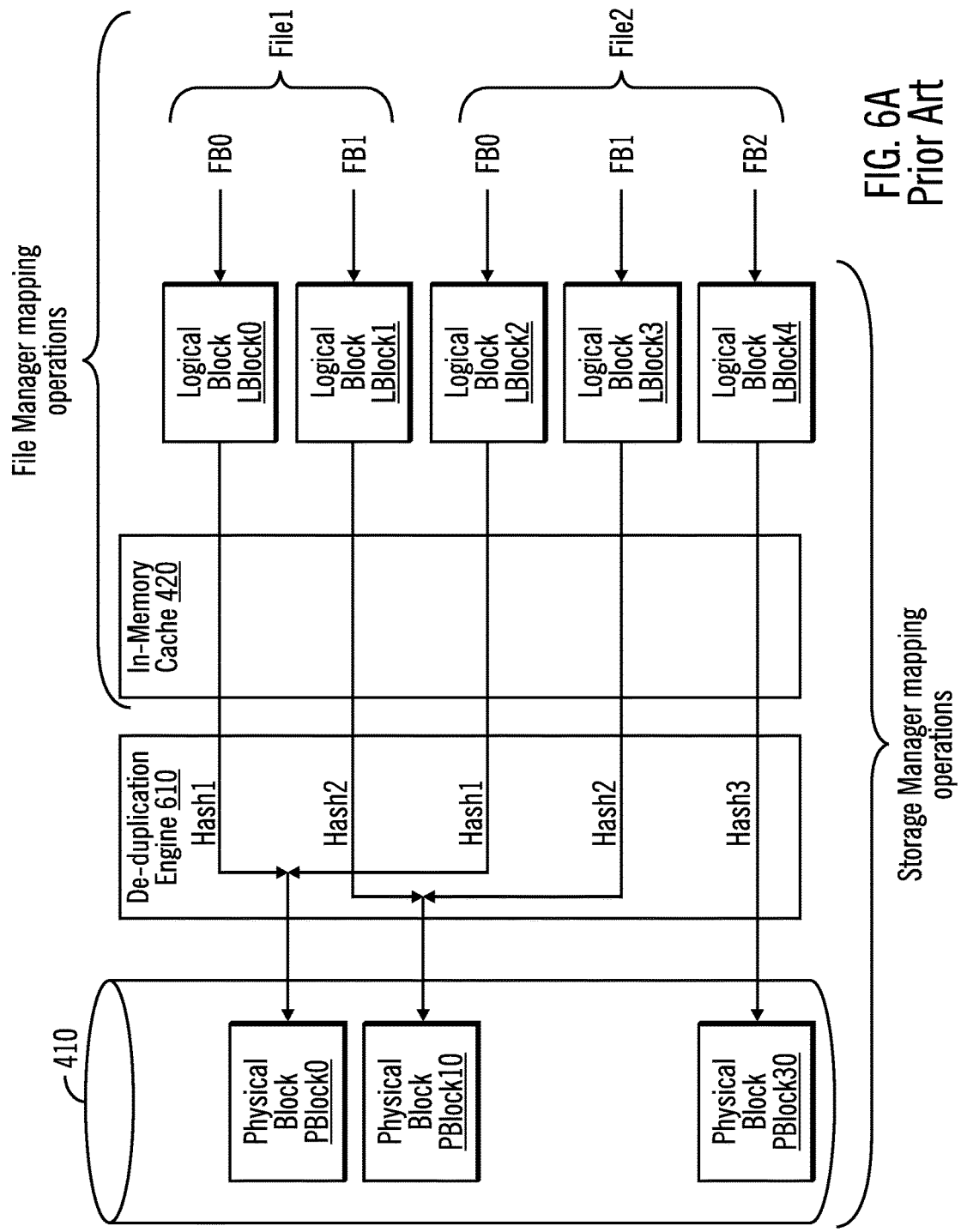
FIG. 6a illustrates an example of prior art file manager mapping operations and prior art storage manager mapping operations including prior art deduplication operations.

FIG. 6a depicts a prior art deduplication process for the file blocks of the files File1 and File2 of FIG. 3. In a typical storage system, a deduplication engine 610 is placed between the cache 420 and the storage 410. The deduplication engine 610 computes a reference pointer, sometimes referred to as a "hash" for each logical block LBlock0-LBlock4 of the files File1, File2. For logical blocks with matching hash value, a single physical block of the storage 410 is mapped by the common hash value to each logical block with that common hash value.

For example, file blocks FB0 and FB1 of the file File1 are mapped by the prior art file manager to logical blocks LBlock0 and LBlock1, respectively. File blocks FB0, FB1 and FB2 of the file File2 are mapped by the prior art file manager to logical blocks LBlock2, LBlock3 and LBlock4, respectively. In this example, the data sets contained by the logical blocks LBlock0 and LBlock2 happen to be the same. Accordingly, the hash value Hash1 computed for each of the logical blocks LBlock0 and LBlock2 is the same, and the common hash value Hash1 may be used a reference pointer for both the logical blocks LBlock0 and LBlock2 to point to the same physical block PBlock0 containing the common data set.

In this manner, both logical blocks LBlock0 and LBlock2 are mapped by the deduplication engine of the storage manager using a common reference pointer Hash1, to a single physical block PBlock0 which may be used to store the data for both logical blocks LBlock0 and LBlock2 since their data is the same. Thus, duplication of data storage is eliminated by deduplicating the physical blocks to a single common physical block PBlock0.

Similarly, in this example, the data sets contained by the logical blocks LBlock1 and LBlock3 are the same. Accordingly, the hash value Hash2 computed for the logical blocks LBlock1 and LBlock3 is the same, and the common hash value Hash2 may be used a reference pointer for both of the logical blocks LBlock1 and LBlock3 to point to the same physical block PBlock10 containing the common data set. In this manner, both logical blocks LBlock1 and LBlock3 are mapped by the deduplication engine of the storage manager using a common reference pointer Hash2, to a single physical block PBlock10 which may be used to store the data for both logical blocks LBlock1 and LBlock3 since their data is the same.

However, in this example, the data set contained by the logical block LBlock4 is not the same as that contained by any of the other logical blocks of the other files. Accordingly, a different hash value Hash3 is computed by the deduplication engine 610 for the logical block LBlock4. Thus, the hash value Hash3 may be used as a reference pointer to map the logical block LBlock4 to its own physical block PBlock30 containing the unique data set of logical block LBlock4.

A deduplication engine typically maintains a deduplication mapping data structure, a prior art example of which is illustrated in FIG. 6b. A typical deduplication mapping data structure has an entry for each physical block of storage PBlock0-Pblockn. Each entry frequently includes a status indication for the physical block of the entry as "allocated" or "free", a hash value or other reference pointer mapping one or more logical blocks to the physical block of the entry, and a list of the logical blocks being mapped by the reference pointer to the physical block of the entry.

When a logical block is the subject of a write operation and that logical block is flushed to the deduplication engine, in a typical deduplication write processing of that block, a reference pointer value is calculated for the block containing the new data. If the calculated reference pointer value matches that with an existing entry in the deduplication table, the logical block is added to the "referencing logical block" field of the deduplication mapping data structure.

Thus, in the example of FIG. 6b, in a write operation to logical block LBlock2, a reference pointer value Hash1 is calculated for the logical block LBlock2 when that block is flushed to the deduplication engine. Here, a logical block LBlock0 containing the same data as logical block LBlock2 was earlier flushed to the deduplication engine and the same reference pointer value Hash1 was calculated for the logical block LBlock0 since the logical blocks LBlock0 and LBlock2 contain the same data. Since the reference pointer value Hash1 calculated for the logical block LBlock2 matches the reference pointer value Hash1 calculated for the logical block LBlock0, the logical block LBlock2 is added to the list of logical blocks mapped by the reference pointer Hash1 to a particular physical storage block which in the example of FIGS. 6a, 6b is physical block PBlock0 containing the common set of data of the logical blocks mapped to it by the reference pointer Hash1, that is, the logical blocks LBlock0 and LBlock2. In this manner, the deduplication engine avoids writing the set of data of logical block LBlock2 to storage since the same set of data was already written to physical block PBlock0 for logical block LBlock0. However, if the reference pointer calculated for a block being flushed to the deduplication engine does not match a preexisting reference pointer value of the deduplication mapping table, a new entry is added to the deduplication mapping data structure for the logical block being flushed and the new data is written to a free physical block of storage. Thus, as shown for the logical block LBlock4 and its calculated reference pointer Hash3, for example, the calculated reference pointer value Hash3 is added to the entry to map the logical block LBlock4 of the entry to the physical block PBLock50 to which the new data was written.

Figure 7A:
FIGS. 7a-7c illustrates an example of prior art storage manager operations including prior art deduplication operations in connection with a prior art copy on write operation.
Figure 7B:
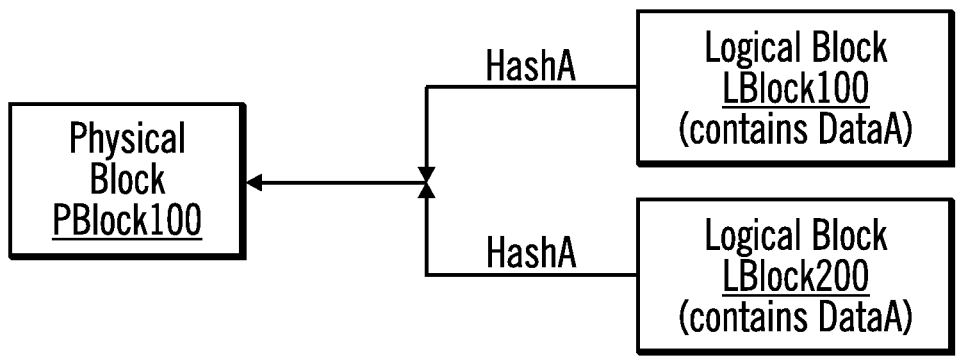
Figure 7C:
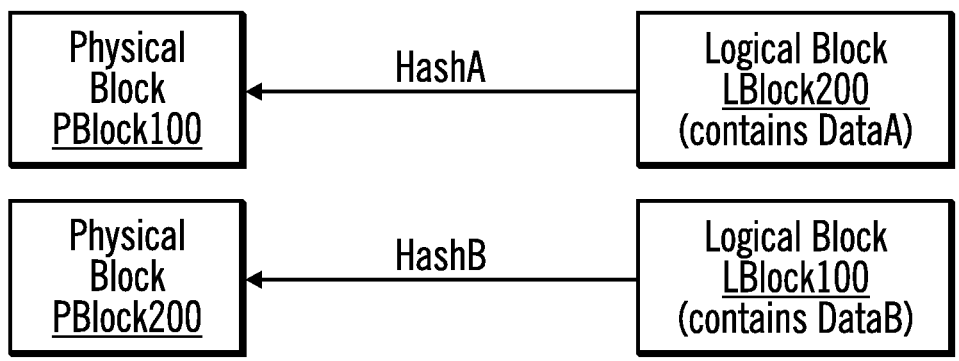

FIGS. 7a-7c depict an example of the deduplication operations of a prior art deduplication engine of a prior art storage manager in connection with prior art copy-on-write operations. In this example, a hash value HashA is computed by the deduplication engine 610 (FIG. 6a) for the logical block LBlock100 of FIG. 5a containing a data set DataA. Thus, the hash value HashA may be used as a reference pointer to map the logical block LBlock100 to a physical block PBlock100 (of storage such as the storage 410) containing the data set DataA of logical block LBlock100. However, should a program need to write data to the file block FB0 of the first file File1 (FIG. 5a) mapped to the logical block LBlock 100, in a prior art copy-on-write operation, a new logical block LBlock200 is allocated by the file manager as discussed above. The newly allocated logical block LBlock200 is initially empty as depicted in FIG. 7a. Accordingly, the allocated logical block LBlock200 is initially not mapped to a corresponding physical block of the storage.

In anticipation of the data write operation, the original data set DataA is read/write copied in read and write operations from logical block LBlock100 to the new logical block LBlock200 as shown in FIG. 7b. Thus, the original data set DataA is read from logical block LBlock100 and written to the new logical block LBlock200. Once the logical block LBlock200 is flushed to the deduplication engine 610 (FIG. 6), the deduplication engine 610 will compute a hash value for the logical block LBlock200. Since the logical blocks LBlock100 and LBlock200 have the same data set DataA, the deduplication engine 610 will compute the same hash value HashA for the logical block LBlock200 as it did for the logical block LBlock100. The common hash value HashA may be used as a reference pointer to map both the logical blocks LBlock100 and LBlock200 to the common physical block PBlock100 containing the common data set DataA, as shown in FIG. 7b.

Once the new data set DataB is written to the logical block LBlock100 pursuant to the write operation as shown in FIG. 7c, and the logical block LBlock100 is flushed to the deduplication engine 610, a new hash value HashB is computed by the deduplication engine 610 for the logical block LBlock100. The new hash value HashB may be used as a reference pointer to map the logical block LBlock100 to another physical block Pblock200 to which the new data set DataB is written. The new logical block LBlock200 still contains the original data set DataA and continues to be mapped by the original hash value HashA to the original physical block PBlock100.

In accordance with the present description, it is noted that the above described prior art copy-on-write operation includes two separate write operations. One write operation is part of a read/write copy operation in which the original data set DataA is read from logical block LBlock100 and written to the new logical block LBlock200. Another write operation is the write operation which writes the new data set DataB to the new physical block PBlock200. These multiple write operations can affect performance overhead.

Moreover, in accordance with the present description, it is noted that the point-in-time snap copy is frequently made for backup or check-pointing purposes to provide the capability to restore back to that image in the event of a failure. Programs usually access the latest data and therefore the copy of the original data set DataA in cache is often not needed, which can lead to an underutilization of cache space.

Still further, in accordance with the present description, it is noted that since the logical blocks LBlock100 and LBlock200 initially have the same data set DataA, the deduplication engine 610 will compute the same hash value HashA for the logical block LBlock200 as it did for the logical block LBlock100 once the logical block LBlock200 is flushed to the deduplication engine 610. This additional computation by the deduplication engine 610 of the same hash value HashA may further increase performance overhead.

In accordance with the present description, the copy-on-write operation may be modified as discussed below to, in one embodiment, reduce or eliminate block read/write copying of redundant data. Still further, cache utilization and deduplication performance may be improved in some embodiments.

As explained in greater detail below, a copy-on-write mechanism in a deduplication environment in accordance with the present description, bypasses the prior operation of read/write copying old data to a new logical block after a point-in-time snap copy. Instead, in one embodiment, when the old block containing the new data is flushed to the deduplication engine, the deduplication engine is notified that the existing reference pointer previously mapping the original logical block to the original physical block containing the old data, may be reassigned to the new logical block so that the new block is mapped to the original physical block using the existing reference pointer. In this manner, the read/write copying of the old data to a new block may be bypassed. In addition, the recalculation of the existing pointer may be bypassed as well. Still further, cache utilization may be enhanced.

Figure 8:
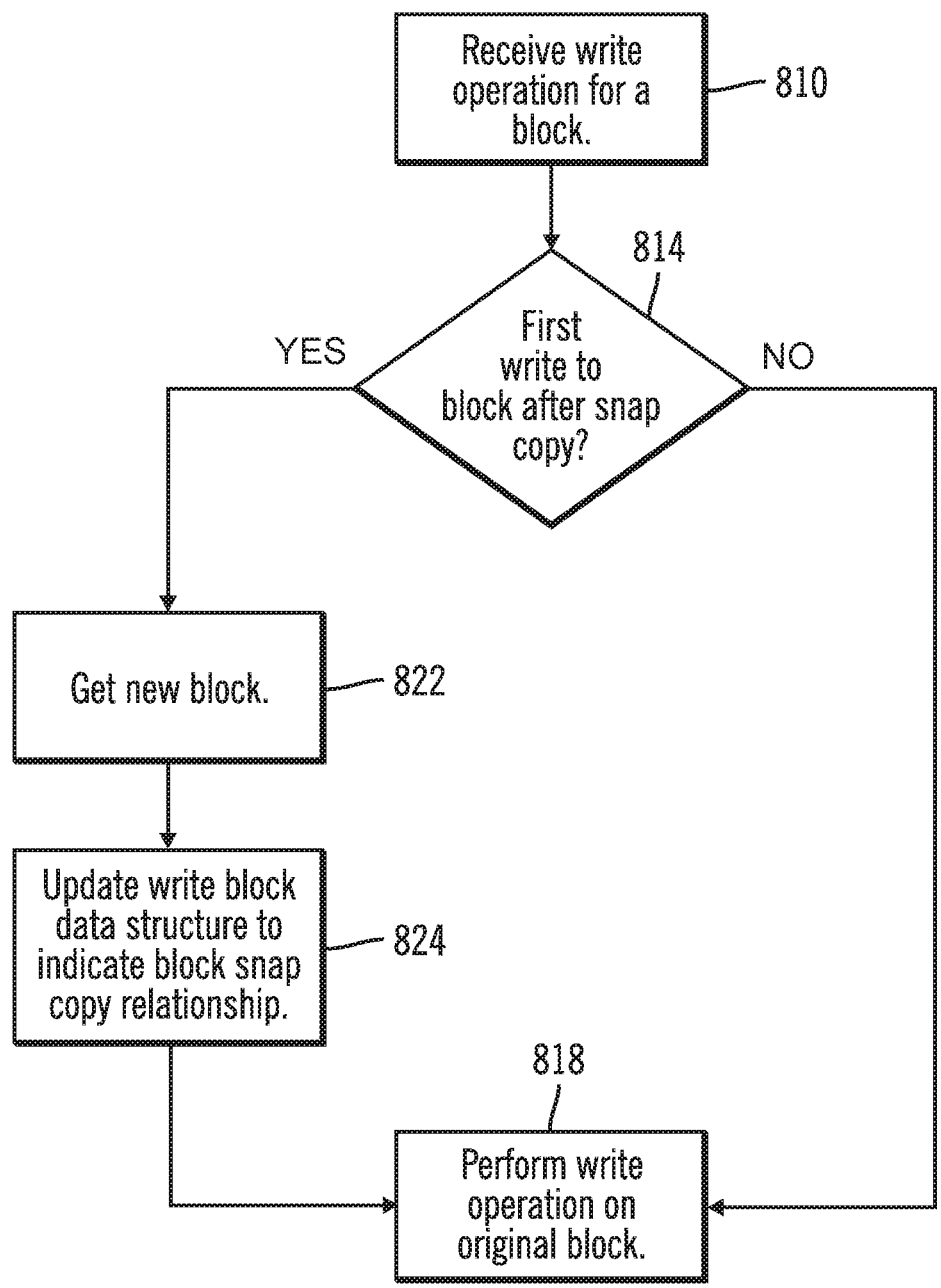
FIG. 8 illustrates an example of file manager operations in connection with a copy on write operation in accordance with one embodiment of the present description.

FIG. 8 illustrates one example of operations of a networked storage system employing a copy-on-write operation in accordance with the one embodiment of the present description. In this example, the operations of FIG. 8 are performed by a file manager such as the file manager 310 (FIG. 3). It is appreciated that in other embodiments, these operations may be performed by other programmed processors such as a storage manager or an host-run application, for example.

Figure 9A:
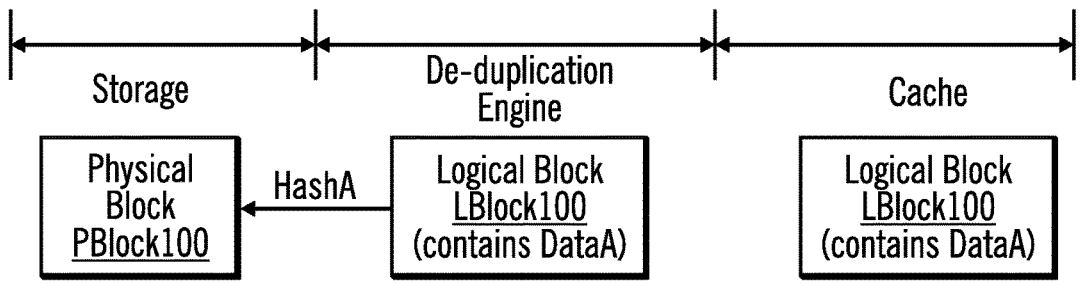
FIGS. 9a-9c illustrate an example of file and storage manager operations including deduplication operations in connection with a copy on write operation in accordance with one embodiment of the present description.

In a first operation, a storage control unit, such as the storage control unit 104a (FIG. 1), for example, receives (block 810) a write operation for a block such as the logical block LBlock100, for example, of FIG. 9a. In this example, the logical block LBlock100 contains an original data set DataA and resides in a cache memory such as the cache 320, for example of FIG. 3. The logical block LBlock100 is mapped by the deduplication engine 318 (FIG. 3) to a physical storage block PBlock100 of the storage 106a, storing the original data set DataA. The reference pointer HashA maps the logical block LBlock100 to the physical storage block PBlock100. It is appreciated that the a write operation may be performed on blocks contained in other memory or storage devices.

The illustrated embodiment depicts files as subdivided into file blocks, and logical files subdivided into logical blocks and physical files subdivided into physical blocks. It is appreciated that in some embodiments, files may not be subdivided, or may be subdivided into units other than blocks.

In another operation, a determination is made as to whether (block 814), the write operation is the first write operation to a block after a snap copy of the block has been made. If not, the storage control unit proceeds to write (block 818) the new data to the original block which is logical block LBlock100 in this example. At some point, the logical block LBlock100 will be flushed to the deduplication engine 318 which will compute a new hash value and write the new data to a physical storage block such as the physical block PBlock100 to which the logical block LBlock100 is originally mapped, unless the new data has previously been written and continues to be stored in another physical block as indicated by the computed hash value.

Conversely, if it is determined (block 814) that the write operation is the first write operation to a block after a snap copy of the block has been made, a new block such as the logical block LBlock200 (FIG. 9b) is allocated (block 822). In one embodiment, the logical block LBlock200 may be allocated by a file manager such as the file manager 310 and may reside in the cache 320 or other memory accessible to the file manager 310. In another embodiment, the logical block LBlock200 may be allocated and managed by a storage manager such as the storage manager 314.

Figure 9B:
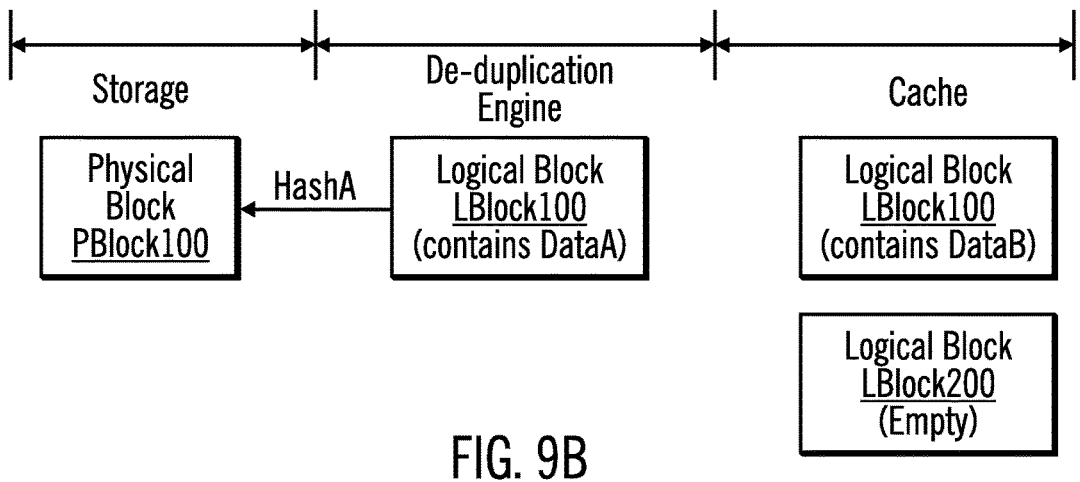
Figure 9C:
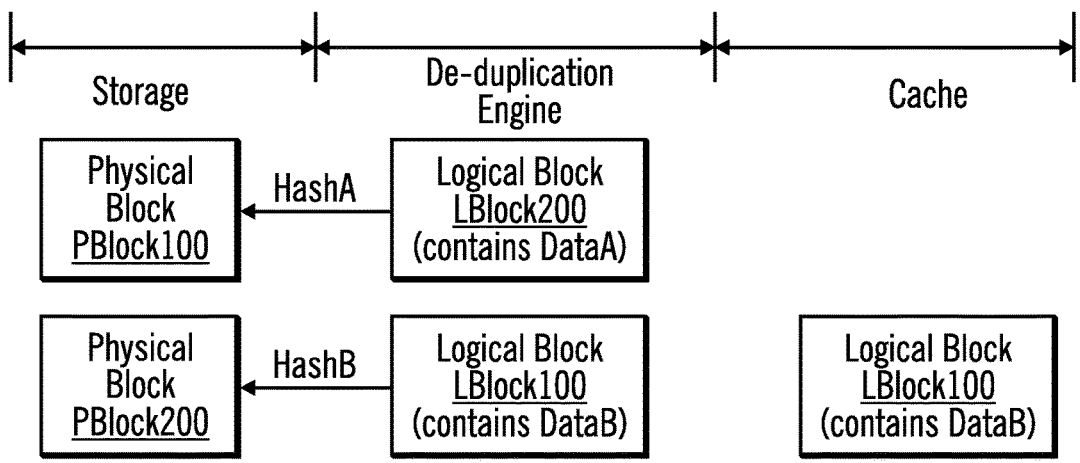

In contrast to the prior art copy-on-write operation, the original dataset DataA of the original logical block LBlock100 is not read/write copied to the newly allocated block LBlock200 in this example. Instead, the newly allocated block LBlock200 remains empty as indicated in FIG. 9b. In addition, a write block data structure is updated (block 824) to indicate that the original logical block LBlock100 and the newly allocated block LBlock200 are in an "uncopied" snap copy relationship. In this snap copy relationship, the original block LBlock100 is the source block and the newly allocated logical block LBlock200 is the target block.

In the prior art, a file manager may maintain a data structure containing an entry for each logical block and an allocation status indication indicating whether the block has been "allocated" or is "free" to be allocated. In contrast, FIG. 10a shows an example of a write block data structure 1010 which, in accordance with the present description, a status state of "UnCopied" in addition to "allocated" and "free" is utilized. New blocks allocated during a copy-on-write mechanism in accordance with the present description may be accorded a status of "UnCopied".

Still further, a field is added to the data structure to indicate the snap copy relationship between the old and new blocks. Thus, the old and new blocks may store the logical block value of the other block to indicate this snap copy relationship until the flush operation to the deduplication engine as described below.

In the example of FIG. 10a, an entry for the source logical block LBlock100 is updated to indicate that the logical block LBlock100 is in a snap copy relationship with the newly allocated logical block LBlock200. Similarly, the write block data structure 1010 is updated to provide an entry for the newly allocated logical block LBlock200 and to indicate that the target logical block LBlock200 is in a snap copy relationship with the original logical block LBlock100. Since the original data set DataA has not been read/write copied from the original or source logical block LBlock100 to the newly allocated target logical block LBlock200, the status of the newly allocated logical block LBlock200 is indicated as "uncopied". The status of the original logical block LBlock100 remains "allocated."

The new data set DataB of the write operation may be written (block 818) to the original logical block LBlock100 so that the original logical block LBlock100 contains the new data set DataB. However, at this point, in this example, the original logical block LBlock100 remains mapped by the reference pointer HashA to the physical block PBlock100 by the deduplication engine until the original logical block LBlock100 is flushed to the deduplication engine 318.

Figure 11:
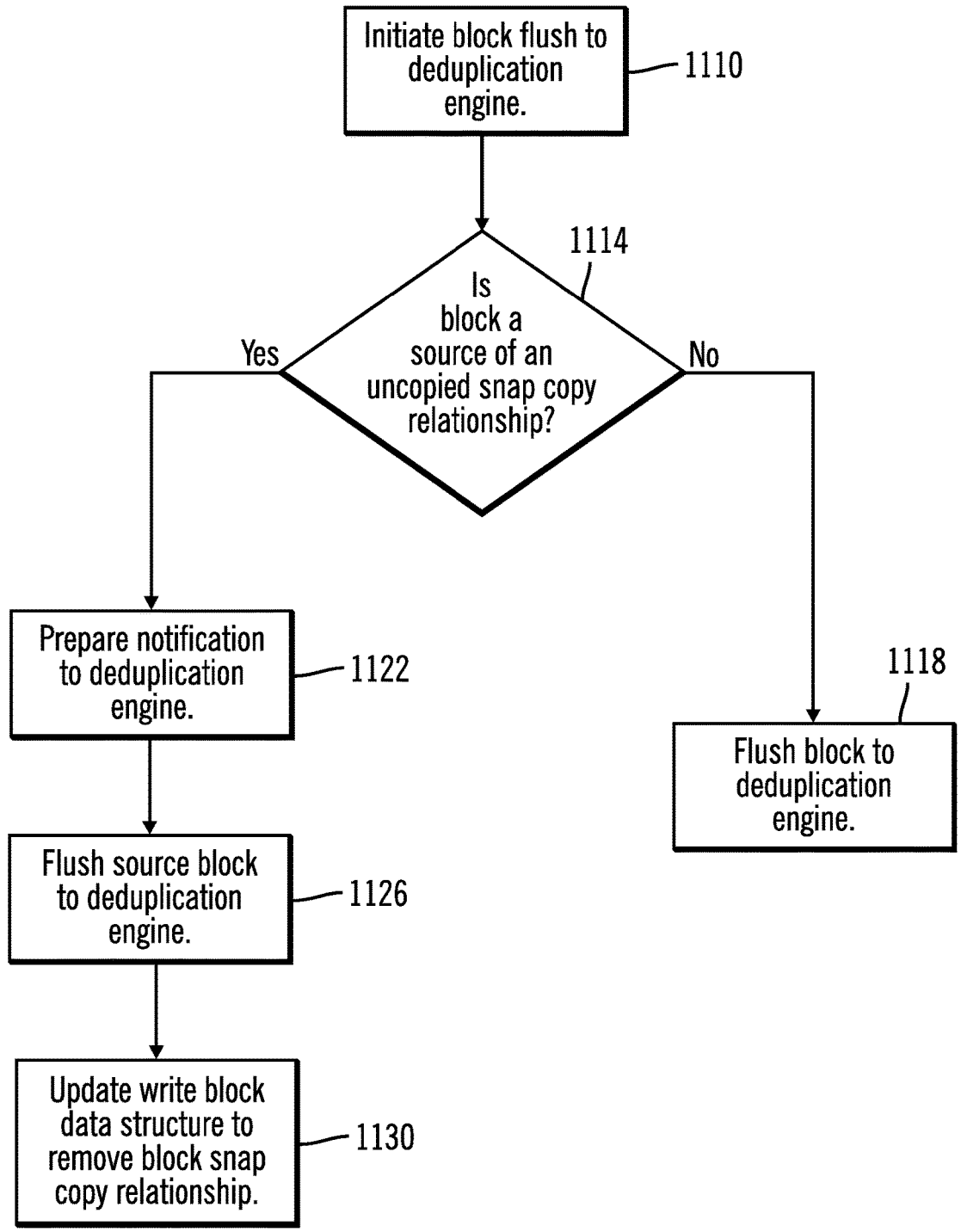
FIG. 11 illustrates an example of file manager operations including a block flush operation in connection with a copy on write operation in accordance with one embodiment of the present description.

FIG. 11 illustrates one example of operations of a file manager such as the file manager 310 (FIG. 3) to flush a logical block to a deduplication engine such the deduplication engine 318, for example, in a networked storage system employing a copy-on-write operation in accordance with the one embodiment of the present description. Upon initiating (block 1110) a flush operation of a block to the deduplication engine, a determination (block 1114) is made as to whether the block to be flushed is a source block of an uncopied snap copy relationship. In the illustrated embodiment, the file manager 310 may access the write block operation data structure (FIG. 10a) 1010 for this determination. If it is determined (block 1114) that the block to be flushed is not a source block of an uncopied snap copy relationship, the block may be flushed (block 1118) to the deduplication engine in the usual manner.

Conversely, if it is determined (block 1114) that the block to be flushed is a source block of an uncopied snap copy relationship, a notification of such is prepared (block 1122) for the deduplication engine and the block is flushed (block 1126) to the deduplication engine. In this example, when the logical block LBlock100 is to be flushed to the deduplication engine, the file manager 310 may access the write block operation data structure 1010 (FIG. 10*a*) and determine that the logical block LBlock100 is the source block of a snap copy relationship with the target logical block LBlock200 and that the original data (data set DataA) has not been read/write copied from the source logical block LBlock100 to the target logical block LBlock200 as indicated by the uncopied status of the target logical block LB200. Accordingly, a notification is prepared (block 1122) to notify the deduplication engine that the logical block LBlock100 is the source block of a snap copy relationship with the target logical block LBlock200 and that the original data (data set DataA) has not been read/write copied from the source logical block LBlock100 to the target logical block LBlock200, and the source logical block LBlock100 is flushed (block 1126) to the deduplication engine.

In one embodiment, the notification to the deduplication engine may be provided to the deduplication engine using a separate off band communication channel, for example. In other embodiments, reserved bits of a Small Computer System Interface (SCSI) Command Descriptor Block (CDB) may be utilized to transmit the notification to the deduplication engine. It is appreciated that notifications may be transmitted in other formats and channels, depending upon the particular implementation.

As explained in greater detail below, the copying of the original data set DataA to the snap copy logical block LB200 is achieved, in the illustrated embodiment by a remapping operation by the deduplication engine in response to the notification prepared by the file manager and without an actual read/write copying of data from one logical block to the other. Since the deduplication engine will effectively perform the copying of the snap copy relationship (but without actual read/write copying of data), the file manager may update (block 1130) the write block operation data structure 1010 (FIG. 10*a*) to remove the indication of the block snap copy relationship. Accordingly, as shown in FIG. 10*b*, the indication of the snap copy relationship between the logical block LBlock100 and the logical block LBlock200 is removed. In addition, the status of the target logical block LBlock200 may be updated to "allocated" since the status of the target logical block LBlock200 will no longer be "uncopied" once the remapping operation has been completed by the deduplication engine.

Figure 12:
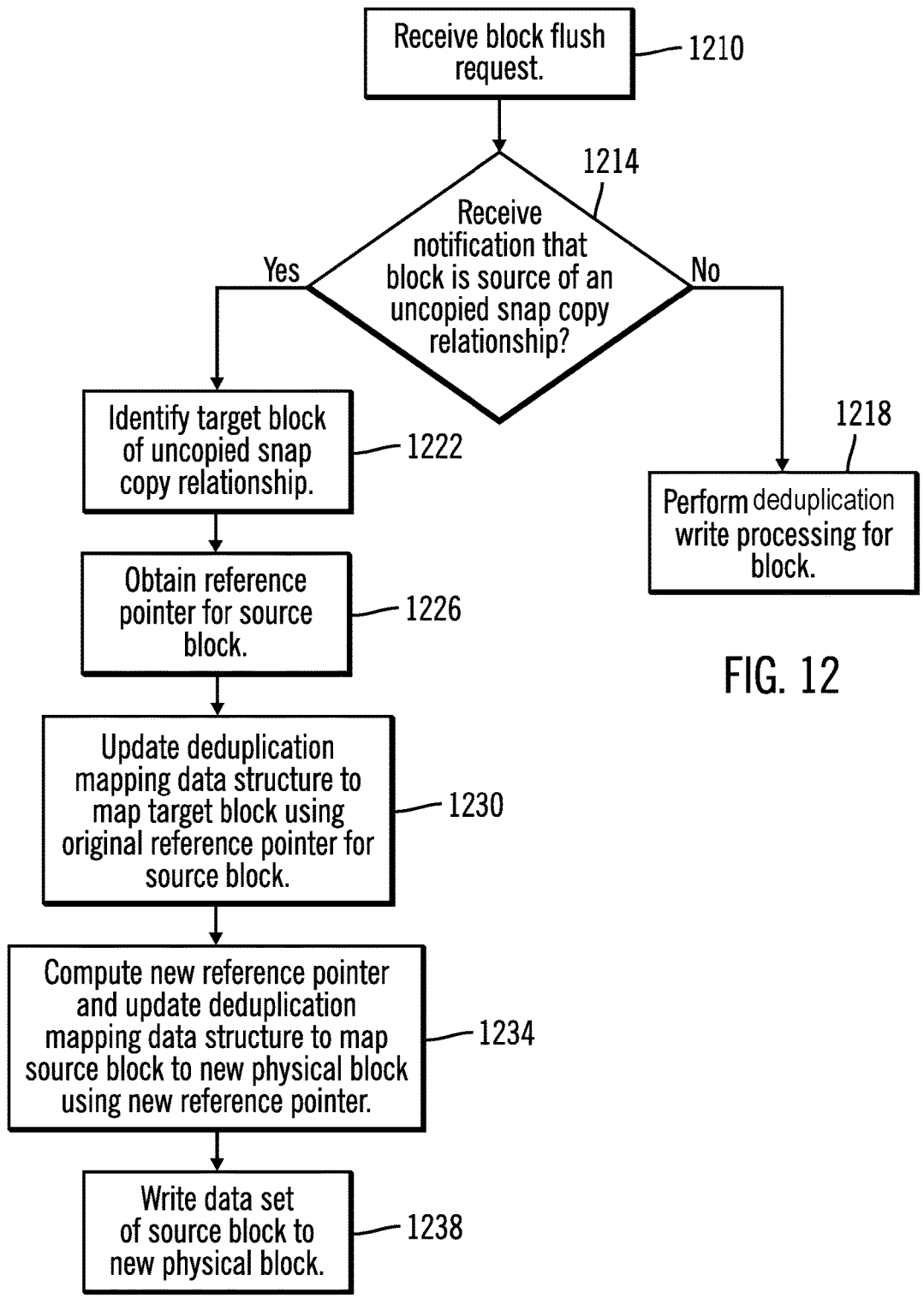
FIG. 12 illustrates an example of deduplication engine operations including a block flush operation in connection with a copy on write operation in accordance with one embodiment of the present description.

FIG. 12 illustrates one example of operations of a deduplication engine such as the deduplication engine 318 (FIG. 3) in response to a logical block being flushed to the deduplication engine in a networked storage system employing a copy-on-write operation in accordance with the one embodiment of the present description. Upon receipt of a block flush request from a file manager such as the file manager 310, a determination (block 1214) is made as to whether the flush request is accompanied by a notification that the block being flushed to the deduplication engine is a source block of an uncopied snap copy relationship. If not, the deduplication engine performs (block 1218) the usual write processing for the block.

Conversely, if it is determined (block 1214) that the flush request is accompanied by a notification that the block being flushed to the deduplication engine is a source block of an uncopied snap copy relationship, the notification is accessed by the deduplication engine to identify (block 1222) the target block of the uncopied snap copy relationship. In this example, the notification identifies the empty logical block LB200 as the target block of the uncopied snap copy relationship of the source block LBlock100 being flushed to the deduplication engine. In addition, the deduplication engine obtains (block 1226) the reference pointer for the block being flushed which is the source block of the uncopied snap copy relationship.

In one embodiment, the deduplication engine may obtain (block 1226) the reference pointer for the source block being flushed by accessing a deduplication mapping data structure which is usually maintained by the deduplication engine. FIG. 13*a* shows one example of a deduplication mapping data structure 1310 which includes in one entry, the logical block LB100 which is the source block of an uncopied snap copy relationship in this example. As shown by the deduplication mapping data structure 1310 of FIG. 13*a*, the source logical block LBlock100 was originally mapped by reference pointer HashA to physical storage block PBlock100 which contains the original data set DataA.

Upon receipt (block 1214) of the notification and upon identification (block 1222) of the target block of the uncopied snap copy relationship as being the logical block LBlock200, the deduplication mapping data structure 1310 may be updated (block 1230) to add the target logical block LBlock200 to the list of logical blocks mapped by the reference pointer HashA to the physical storage block PBlock100 as shown in FIG. 13*b*. Since the physical storage block PBlock100 contains the original data set DataA, the data set DataA is effectively copied to the new logical block LBlock200 without actually read/write copying data from the original logical block LBlock100 to the new logical block LBlock200. Thus, the logical block LBlock200 is effectively no longer empty but instead is mapped to the physical storage block PBlock100 containing the original data set DataA. Accordingly, read operations directed to logical block LBlock200 will yield the original data set DataA as stored in the storage 106*a* and may be cached in the cache 320 (FIG. 3).

As previously mentioned, when a logical block is the subject of a write operation and that logical block is flushed to the deduplication engine, a reference pointer value is calculated for the block containing the new data. In this example, when the source block LBlock100 is flushed to the deduplication engine, the calculated reference pointer will be computed (block 1234) to have a new value instead of the prior value HashA since the source logical block LBlock100 contains the new data set DataB. In this example, the reference pointer value calculated is HashB which does not match any preexisting reference pointer value of the deduplication mapping data structure 1310.

Accordingly, the deduplication mapping data structure 1310 may be updated (block 1234) so that the logical block LBlock100 is removed from the list of logical blocks mapped by the preexisting reference pointer HashA, as indicated by the cross-out in the referencing logical block field for the entry containing the reference pointer value HashA. In addition, a new entry is added to the deduplication mapping data structure 1310 for the source logical block LBlock100 and the reference pointer value HashB as shown in FIG. 13*b*. The new data set DataB is written (block 1238) to a previously free physical storage block which in this example is physical block PBLock200. The reference pointer value HashB is added to the entry for logical block LBlock100 to map logical block LBlock100 to the physical block PBlock200.

Figure 14:
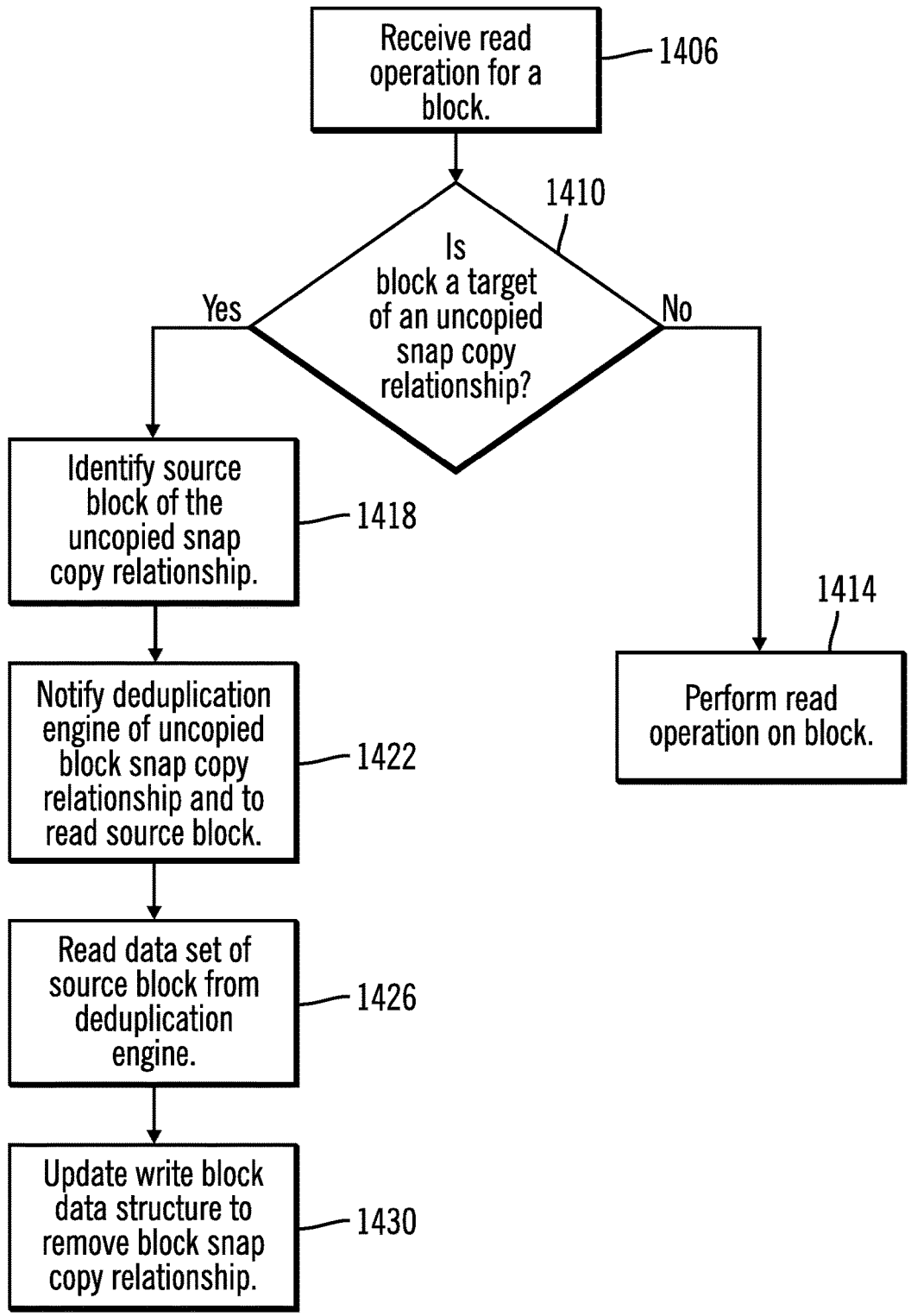
FIG. 14 illustrates an example of file manager operations including a block flush operation in connection with a read operation in accordance with one embodiment of the present description.

FIG. 14 is directed to one example of operations of a file manager such as the file manager 310 (FIG. 3) to read a block such as the logical block LBlock200, for example, in a networked storage system employing a copy-on-write operation in accordance with the one embodiment of the present description. In response to the reception (block 1406) of a read operation request from a host, for example, a determination is made (block 1410) as to whether the block to be read is the target of an uncopied snap copy relationship.

In the illustrated embodiment, the file manager may determine whether the block to be read (LBlock200, in this example) is the target of an uncopied snap copy relationship by accessing a write block operation data structure such as the data structure 1010 depicted in FIGS. 10a, 10b. As discussed, upon flushing (block 1126, FIG. 11) the source block of an uncopied snap copy relationship to the deduplication engine, the write block operation data structure is updated (block 1130, FIG. 11) to remove the uncopied snap copy relationship for source and target blocks. Thus, upon flushing the source block, logical block LBlock100, to the deduplication engine, the write block operation data structure 1010 is updated as shown in FIG. 10b so that the uncopied snap relationship of logical blocks LBlock100 and LBlock200 is removed.

Further, as discussed above, once the source logical block LBlock100 of the uncopied snap copy relationship is flushed to the deduplication engine, the data set DataA is effectively copied to the new logical block LBlock200 without actually read/write copying data from the original logical block LBlock100 to the new logical block LBlock200. Thus, once the source logical block LBlock100 of the uncopied snap copy relationship is flushed to the deduplication engine, the logical block LBlock200 is no longer empty but instead is mapped to the physical storage block PBlock100 containing the original data set DataA. Accordingly, read operations directed to logical block LBlock200 will yield the original data set DataA as stored in the storage 106a. Thus, the logical blocks LBlock100 and LBlock200 are no longer in an uncopied snap copy relationship as indicated by the write block operation data structure 1010 which has been updated by the file manager as shown in FIG. 10b.

Thus, if the read operation directed to the logical block LB200 occurs after the source block LBlock100 has been flushed to the deduplication engine, the file manager will determine (block 1410) by accessing the updated file structure 1010, that the logical block LB200 is no longer in an uncopied snap copy relationship and thus will no longer be empty. Accordingly, the read operation on the block LBlock200 may be performed (block 1414).

Conversely, if the read operation directed to the logical block LB200 occurs before the source block LBlock100 has been flushed to the deduplication engine, the file manager will determine (block 1410) by accessing the original (not updated) file structure 1010 of FIG. 10a, that the logical block LB200 is still in an uncopied snap copy relationship and thus will be empty. Accordingly, the file manager identifies (block 1418) the source block of the uncopied snap copy relationship as identified by the original write block operation data structure 1010 of FIG. 10a, which is the logical block LBlock100 in this example. In a manner similar to that discussed above in connection with FIG. 11, the deduplication engine is notified (block 1418) that the logical block LBlock100 is the source block of an uncopied snap relationship, in order to obtain the data for the logical block LBlock200, the subject of the read operation.

In response, the data set, in this example, the original data set DataA, is read (block 1426) from the deduplication engine to provide the data of the logical block LBlock200, the subject of the read operation in this example. As set forth above, prior to the flushing operations of FIGS. 11 and 12, the source block LBlock100 is mapped by the reference pointer HashA to the physical block PBlock100 (which contains the original data set DataA) as shown in FIG. 13a.

Here too, the copying of the original data set DataA to the snap copy logical block LB200 is achieved, in the illustrated embodiment by a remapping operation by the deduplication engine in response to the notification prepared by the file manager and without an actual read/write copying of data from one logical block to the other. Since the deduplication engine will effectively perform the copying of the snap copy relationship (but without actual read/write copying of data), the file manager may update (block 1430) the write block operation data structure 1010 (FIG. 10a) to remove the indication of the block snap copy relationship. Accordingly, as shown in FIG. 10b, the indication of the snap copy relationship between the logical block LBlock100 and the logical block LBlock200 is removed. In addition, the status of the target logical block LBlock200 may be updated to "allocated" since the status of the target logical block LBlock200 will no longer be "uncopied" once the remapping operation has been completed by the deduplication engine.

Figure 15:
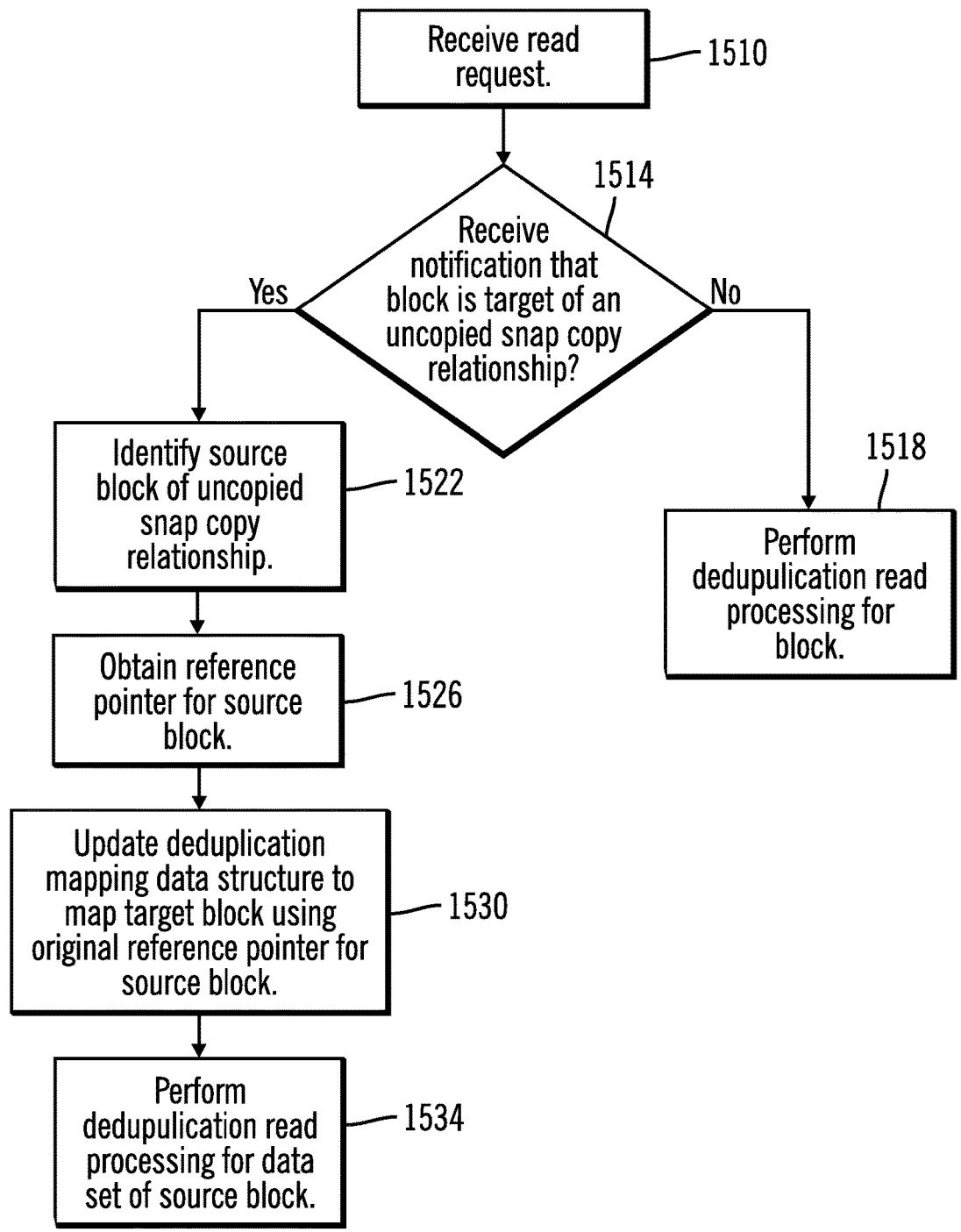
FIG. 15 illustrates an example of deduplication engine operations including a block flush operation in connection with a read operation in accordance with one embodiment of the present description.

FIG. 15 illustrates one example of operations of a deduplication engine such as the deduplication engine 318 (FIG. 3) in response to a read request in a networked storage system employing a copy-on-write operation in accordance with the one embodiment of the present description. Upon receipt (block 1510) of a read request from a file manager such as the file manager 310, a determination (block 1514) is made as to whether the read request is accompanied by a notification that the block to be read from the deduplication engine is a source block of an uncopied snap copy relationship. If not, the deduplication engine performs (block 1518) the usual read processing for the block.

Conversely, if it is determined (block 1514) that the read request is accompanied by a notification that the block being read from the deduplication engine is a source block of an uncopied snap copy relationship, the notification is accessed by the deduplication engine to identify (block 1522) the source block of the uncopied snap copy relationship. In this example, the notification identifies the source logical block LB100 as the source block of the uncopied snap copy relationship for the target block, logical block LBlock200, to be read by the deduplication engine. In addition, the deduplication engine obtains (block 1526) the reference pointer for the source block of the target block of the uncopied snap copy relationship.

In one embodiment, the deduplication engine may obtain (block 1526) the reference pointer for the target block to be read from deduplication engine, by accessing a deduplication mapping data structure such as the deduplication mapping structure of FIG. 13a. In this example, one entry depicts the logical block LB100 which is the source block of an uncopied snap copy relationship in this example. As shown by the deduplication mapping data structure 1310 of FIG. 13a, the source logical block LBlock100 was originally mapped by reference pointer HashA to physical storage block PBlock100 which contains the original data set DataA.

Upon receipt (block 1514) of the notification and upon identification (block 1522) of the target block of the uncopied snap copy relationship as being the logical block LBlock200, the deduplication mapping data structure 1510 may be updated (block 1530) to add the target logical block LBlock200 to the list of logical blocks mapped by the reference pointer HashA to the physical storage block PBlock100 as shown in FIG. 13*b*. Since the physical storage block PBlock100 contains the original data set DataA, the data set DataA is effectively copied to the new logical block LBlock200 without actually read/write copying data from the original logical block LBlock100 to the new logical block LBlock200. Thus, the logical block LBlock200 is no longer empty but instead is mapped to the physical storage block PBlock100 containing the original data set DataA. Accordingly, read operations directed to logical block LBlock200 will yield the original data set DataA as stored in the storage 106*a* and may be cached in the cache 320 (FIG. 3).

As previously mentioned, when a logical block is the subject of a write operation and that logical block is flushed to the deduplication engine, a reference pointer value is calculated for the block containing the new data. In this example, when the source block LBlock100 is flushed to the deduplication engine, the calculated reference pointer will have a new value instead of the prior value HashA since the source logical block LBlock100 contains the new data set DataB. In this example, the reference pointer value calculated is HashB which does not match any preexisting reference pointer value of the deduplication mapping data structure 1310.

Accordingly the logical block LBlock100 is removed from the list of logical blocks mapped by the preexisting reference pointer HashA, as indicated by the cross-out in the referencing logical block field for the entry containing the reference pointer value HashA. In addition, a new entry is added to the deduplication mapping data structure 1310 for the source logical block LBlock100 as shown in FIG. 13*b*. The new data set DataB is written (block 1238) to a previously free physical storage block which in this example is physical block PBLock200. The reference pointer value HashB is added to the entry for logical block LBlock100 to map logical block LBlock100 to the physical block PBlock200.

It is seen from the above that, In accordance with one embodiment of the present description, a copy-on-write operation may be modified to reduce or eliminate block read/write copying of redundant data. Still further, cache utilization and deduplication performance may be improved in some embodiments.

Figure 16:
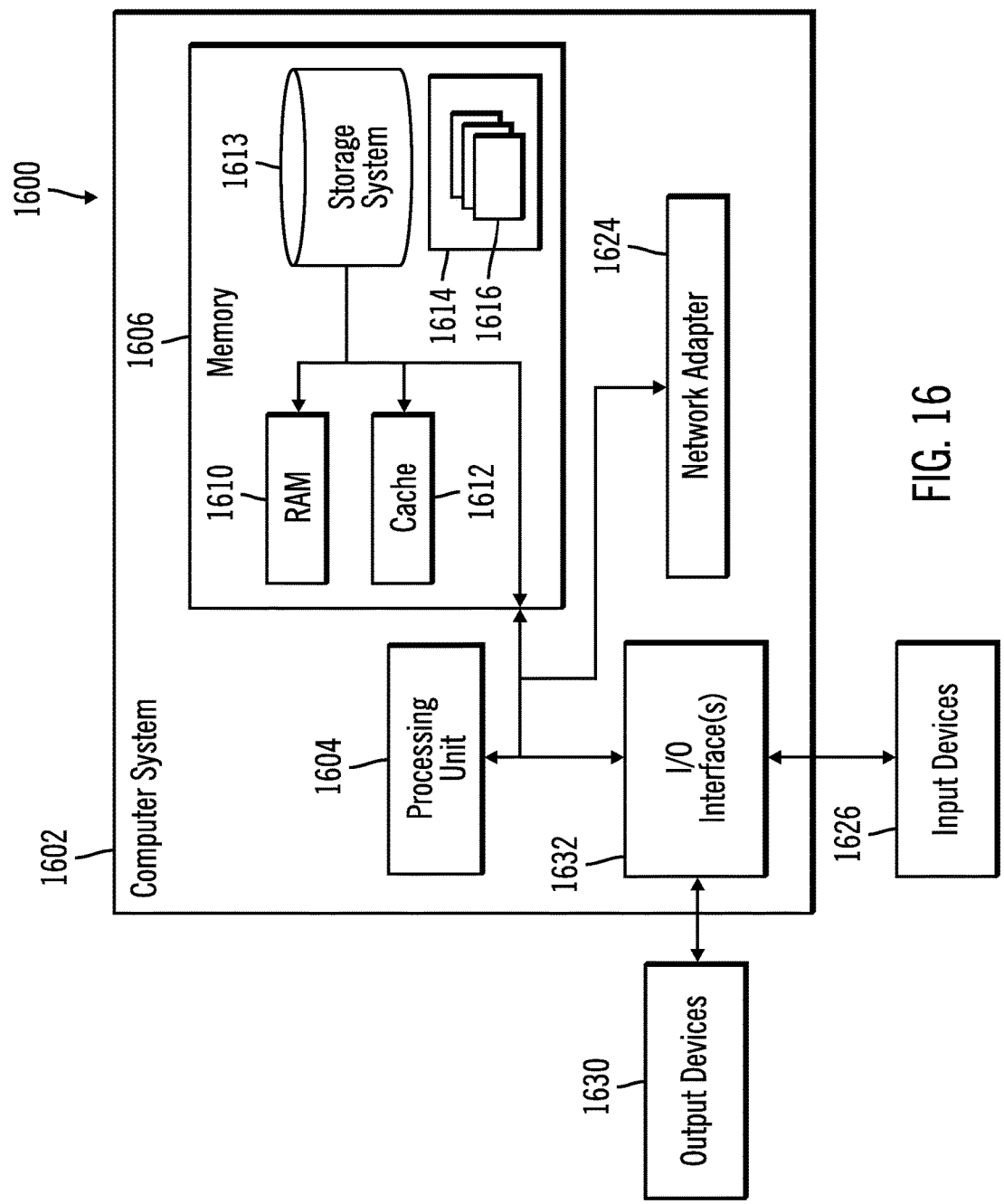
FIG. 16 illustrates one node of a network computing environment, employing copy management in accordance with one embodiment of the present description.

FIG. 16 illustrates one embodiment of a node 1600 of a distributed computing system such a host, application server, storage controller, server or virtual server, of the storage area network 102 of FIG. 2. However, it is appreciated that the node 1600 of FIG. 16 may comprise any suitable computing device 1602, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 16 may perform data processing tasks such as data backup, data deduplication, data mining data capture, data archiving, data replication, bandwidth reduced data replication, encryption of data, etc. and typically involve the transfer of large amounts of data between the hosts 114 and storage 106*a*, 106*b* (FIG. 2).

The node 1600 may perform copy management in accordance with one or more embodiments described herein.

The node may include a processor 1604 (e.g., a microprocessor), a memory 1606 (e.g., a volatile memory device 1610), cache 1612, and storage 1613 (e.g., a non-volatile storage, such as magnetic disk drives, optical disk drives, a tape drive, flash storage etc.). A storage 1614 may comprise an internal storage device or an attached or network accessible storage. Programs 1616 in the storage 1614 are loaded into the memory 1610 and executed by the processor 1604 as represented by an operating system and data processing programs 1616.

Programs 1616 are also provided in the memory 1604 for copy management in accordance with the present description.

The node further includes a network controller or adapter 1624 to enable communication with a network such as an Ethernet, a Fibre Channel Arbitrated Loop, etc. which interconnects the nodes of the distributed computing system. The network controller or adapter 1624 may also enable communication with a network path to a host 114 or communication with a network path to storage 106*a*.

User input devices 1626 provide user input to the processor 1604, and may include a keyboard, mouse, pen-stylus, microphone, touch sensitive display screen, or any other suitable activation or input mechanism. Output devices 1630 are capable of rendering information transmitted from the processor 1604, or other component, such as a display monitor, printer, storage, etc. The input devices 1618, and output devices 1620 may be coupled directly to a node using a suitable KVM (keyboard, video, mouse) switch or other I/O interface 1632 in some applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   performing a copy on write operation on a first logical block mapped by a deduplication engine to a first physical block of data in storage wherein the first physical block stores a first set of data, the performing including:
      establishing a point-in-time snap copy relationship between the first logical block and a second logical block, said establishing including indicating in a first data structure, that the first logical block and the second logical block are in the copy relationship;
      writing a second set of data to the first logical block of the point-in-time relationship to overwrite the first set of data of the first logical block without first read/write copying the first set of data to the second logical block of the point-in-time relationship;
      mapping by a deduplication engine, the second logical block of the relationship to the first physical block storing the first set of data to identify the physical location of data of the second logical block, said mapping including indicating in a second data structure the mapping of the second logical block;
      storing the second set of data in a second physical block of the storage;
      mapping by the deduplication engine, the first logical block of the relationship to the second physical block of the storage to identify the physical location of data of the first logical block, said mapping of the first logical block including indicating in the second data structure the mapping of the first logical block wherein the second physical block stores the second set of data modified from the first set of data;

indicating in the first data structure, a second logical block status that the first logical block has not been copied to the second logical block;

notifying the deduplication engine, of the copy relationship between the first logical block and the second logical block;

transmitting to the deduplication engine, a request to store the second set of data of the first logical block in a physical block of the storage; and updating the first data structure to remove the indication of the copy relationship between the first logical block and the second logical block, and to remove the second logical block status indication that the first logical block has not been copied to the second logical block.

2. The method of claim 1 wherein the mapping by the deduplication engine, the second logical block to the first physical block includes:

receiving from a file manager the notification of the copy relationship between the first logical block and the second logical block; and updating the second data structure having a first pointer mapping the first logical block to the first physical block, so that the first pointer maps the second logical block to the first physical block.

3. The method of claim 2 wherein the mapping by the deduplication engine, the first logical block to the second physical block of the storage, includes:

in response to the request, computing a hash value for the second set of data to generate a second pointer;

updating the second data structure so that the second pointer maps the first logical block to the second physical block; and writing the second set of data to the second physical block.

4. The method of claim 1 further comprising performing a read operation for the second logical block, the performing the read operation including:

determining if the second logical block status remains that the first logical block has not been read/write copied to the second logical block;

upon determining that the second logical block status remains that the first logical block has not been read/write copied to the second logical block, notifying the deduplication engine, of the copy relationship between the first logical block and the second logical block;

transmitting to the deduplication engine, a request to read the first set of data from the first physical block of the storage; and updating the first data structure to remove the indication of the copy relationship between the first logical block and the second logical block, and to remove the indication that the first logical block has not been read/write copied to the second logical block.

5. A system, comprising:

at least one storage subsystem including at least one storage unit adapted to store physical blocks of files, at least one storage controller adapted to access and control storage units of the at least one storage subsystem, wherein the storage controller includes a file manager adapted to manage logical blocks of files and maintain data structures, and a deduplication engine adapted to map logical blocks to physical blocks; and at least one computer readable storage medium having computer readable program instructions embodied therewith, the program instructions executable by the storage controller to cause the storage controller to perform operations, the operations comprising:

performing by the storage controller a copy on write operation on a first logical block mapped by the deduplication engine to a first physical block of data in a storage unit wherein the first physical block stores a first set of data, the performing including:

establishing by the storage controller, a point-in-time snap copy relationship between the first logical block and a second logical block, said establishing including indicating in a first data structure, that the first logical block and the second logical block are in the copy relationship;

writing by the storage controller, a second set of data to the first logical block of the point-in-time relationship to overwrite the first set of data of the first logical block without first read/write copying the first set of data to the second logical block of the point-in-time relationship;

mapping by the deduplication engine of the storage controller, the second logical block of the relationship to the first physical block storing the first set of data to identify the physical location of data of the second logical block, said mapping including indicating in a second data structure the mapping of the second logical block;

storing by the storage controller, the second set of data in a second physical block of a storage unit;

mapping by the deduplication engine of the storage controller, the first logical block of the relationship to the second physical block to identify the physical location of data of the first logical block, said mapping of the first logical block including indicating in the second data structure the mapping of the first logical block wherein the second physical block stores the second set of data modified from the first set of data;

indicating by the file manager of the storage controller, in the first data structure, a second logical block status that the first logical block has not been copied to the second logical block;

notifying by the storage controller, the deduplication engine, of the copy relationship between the first logical block and the second logical block; and transmitting by the storage controller to the deduplication engine, a request to store the second set of data of the first logical block in a physical block of a storage unit; and updating by the storage controller, the first data structure to remove the indication of the copy relationship between the first logical block and the second logical block, and to remove the second logical block status indication that the first logical block has not been copied to the second logical block.

6. The system of claim 5 wherein the mapping by the deduplication engine, the second logical block to the first physical block includes:

receiving by the deduplication engine from the file manager, the notification of the copy relationship between the first logical block and the second logical block; and updating by the deduplication engine, the second data structure having a first pointer mapping the first logical block to the first physical block, so that the first pointer maps the second logical block to the first physical block.

7. The system of claim 6 wherein the mapping by the deduplication engine, the first logical block to the second physical block, includes:
   in response to the request, computing by the deduplication engine a hash value for the second set of data to generate a second pointer;
   updating by the deduplication engine, the second data structure so that the second pointer maps the first logical block to the second physical block; and
   writing by the storage controller, the second set of data to the second physical block.

8. The system of claim 5 wherein the operations further comprise performing by the storage controller, a read operation for the second logical block, including:
   determining by the storage controller if the second logical block status remains that the first logical block has not been read/write copied to the second logical block;
   upon determining that the second logical block status remains that the first logical block has not been read/write copied to the second logical block, notifying by the storage controller the deduplication engine, of the copy relationship between the first logical block and the second logical block;
   transmitting by the storage controller to the deduplication engine, a request to read the first set of data from the first physical block; and
   updating by the storage controller, the first data structure to remove the indication of the copy relationship between the first logical block and the second logical block, and to remove the indication that the first logical block has not been read/write copied to the second logical block.

9. A computer program product for at least one storage subsystem including at least one storage unit adapted to store physical blocks of files, at least one storage controller adapted to access and control storage units of the at least one storage subsystem, wherein the storage controller includes a file manager adapted to manage logical blocks of files and maintain data structures, and a deduplication engine adapted to map logical blocks to physical blocks, the computer program product comprising:
   at least one computer readable storage medium having computer readable program instructions embodied therewith, the program instructions executable by the storage controller to cause the storage controller to perform operations, the operations comprising:
   performing by the storage controller a copy on write operation on a first logical block mapped by the deduplication engine to a first physical block of data in a storage unit wherein the first physical block stores a first set of data, the performing including:
      establishing by the storage controller, a point-in-time snap copy relationship between the first logical block and a second logical block, said establishing including indicating in a first data structure, that the first logical block and the second logical block are in the copy relationship;
      writing by the storage controller, a second set of data to the first logical block of the point-in-time relationship to overwrite the first set of data of the first logical block without first read/write copying the first set of data to the second logical block of the point-in-time relationship;
      mapping by the deduplication engine of the storage controller, the second logical block of the relationship to the first physical block storing the first set of data to identify the physical location of data of the second logical block, said mapping including indicating in a second data structure the mapping of the second logical block;
      storing by the storage controller, the second set of data in a second physical block of a storage unit;
      mapping by the deduplication engine of the storage controller, the first logical block of the relationship to the second physical block to identify the physical location of data of the first logical block, said mapping of the first logical block including indicating in the second data structure the mapping of the first logical block wherein the second physical block stores the second set of data modified from the first set of data;
      indicating by the file manager of the storage controller, in the first data structure, a second logical block status that the first logical block has not been copied to the second logical block;
      notifying by the storage controller, the deduplication engine, of the copy relationship between the first logical block and the second logical block;
      transmitting by the storage controller to the deduplication engine, a request to store the second set of data of the first logical block in a physical block of a storage unit; and
      updating by the storage controller, the first data structure to remove the indication of the copy relationship between the first logical block and the second logical block, and to remove the second logical block status indication that the first logical block has not been copied to the second logical block.

10. The computer program product of claim 9 wherein the mapping by the deduplication engine, the second logical block to the first physical block includes:
    receiving by the deduplication engine from the file manager, the notification of the copy relationship between the first logical block and the second logical block; and
    updating by the deduplication engine, the second data structure having a first pointer mapping the first logical block to the first physical block, so that the first pointer maps the second logical block to the first physical block.

11. The computer program product of claim 10 wherein the mapping by the deduplication engine, the first logical block to the second physical block, includes:
    in response to the request, computing by the deduplication engine a hash value for the second set of data to generate a second pointer;
    updating by the deduplication engine, the second data structure so that the second pointer maps the first logical block to the second physical block; and
    writing by the storage controller, the second set of data to the second physical block.

12. The computer program product of claim 9 wherein the operations further comprise performing by the storage controller, a read operation for the second logical block, including:
    determining by the storage controller if the second logical block status remains that the first logical block has not been read/write copied to the second logical block;
    upon determining that the second logical block status remains that the first logical block has not been read/write copied to the second logical block, notifying by the storage controller the deduplication engine, of the copy relationship between the first logical block and the second logical block;

transmitting by the storage controller to the deduplication engine, a request to read the first set of data from the first physical block; and updating by the storage controller, the first data structure to remove the indication of the copy relationship between the first logical block and the second logical block, and to remove the indication that the first logical block has not been read/write copied to the second logical block.

* * * * *